United States Patent
Yordanov et al.

(10) Patent No.: US 11,241,953 B2
(45) Date of Patent: Feb. 8, 2022

(54) FUEL SYSTEM MOUNTABLE TO A VEHICLE FRAME RAIL

(71) Applicant: Agility Fuel Systems LLC, Costa Mesa, CA (US)

(72) Inventors: Momchil Yordanov, Kelowna (CA); Chris Forsberg, Kelowna (CA); Andrew Taylor Gordon, Kelowna (CA); Adam Robertson, Kelowna (CA)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 17/149,466

(22) Filed: Jan. 14, 2021

(65) Prior Publication Data

US 2021/0129663 A1 May 6, 2021

Related U.S. Application Data

(63) Continuation of application No. PCT/US2020/023154, filed on Mar. 17, 2020.
(Continued)

(51) Int. Cl.
*B60K 15/067* (2006.01)
*B60K 15/063* (2006.01)
(Continued)

(52) U.S. Cl.
CPC .......... *B60K 15/067* (2013.01); *B60K 15/063* (2013.01); *F16F 15/08* (2013.01); *F16M 13/02* (2013.01); *B60K 2015/0634* (2013.01)

(58) Field of Classification Search
CPC .... B60K 15/03; B60K 15/067; B60K 15/063; B60K 2015/0675; B60K 2015/0634;
(Continued)

(56) References Cited

U.S. PATENT DOCUMENTS

| 1,598,868 | A |   | 9/1926  | Frederick |
|-----------|---|---|---------|-----------|
| 5,054,799 | A | * | 10/1991 | Fingerle ............... B62D 35/001 |
|           |   |   |         | 280/164.1 |

(Continued)

FOREIGN PATENT DOCUMENTS

| CN |    105443221 | 3/2016 |
| DE | 10 2016 002 097 | 9/2016 |

(Continued)

OTHER PUBLICATIONS

International Search Report and Written Opinion in Application No. PCT/US2020/023154, dated Jul. 28, 2020 in 18 pages.

*Primary Examiner* — Minnah L Seoh
*Assistant Examiner* — Maurice L Williams
(74) *Attorney, Agent, or Firm* — Knobbe, Martens, Olson & Bear, LLP

(57) ABSTRACT

A fuel system is provided that includes a fuel system frame and in some cases access steps. The frame can be mounted to a vehicle frame rail. Bracket assemblies can be coupled to the fuel system frame at a plurality of positions. The fuel tank can be mounted at neck portions thereof and can be supported on the frame rail between the neck portions, e.g., spaced a distance from the neck portions in a longitudinal direction of the fuel system. The access steps can be non-rectangular to provide a wide stepping portion even if the fuel system includes large tanks. The steps can be directly supported by an outside surface of the tank.

30 Claims, 21 Drawing Sheets

Related U.S. Application Data

(60) Provisional application No. 62/822,439, filed on Mar. 22, 2019.

(51) Int. Cl.
*F16F 15/08* (2006.01)
*F16M 13/02* (2006.01)

(58) Field of Classification Search
CPC ...... B60K 16/07; B60K 16/073; F16M 13/02; F16F 15/08
USPC .................. 180/69.5; 280/830, 834
See application file for complete search history.

(56) References Cited

U.S. PATENT DOCUMENTS

| | | | |
|---|---|---|---|
| 5,136,752 A | 8/1992 | Bening et al. | |
| 5,527,098 A | 6/1996 | McKinney | |
| 5,810,309 A * | 9/1998 | Augustine | B60K 15/07 |
| | | | 248/154 |
| 6,053,533 A | 4/2000 | Osborn et al. | |
| 6,347,678 B1 | 2/2002 | Osborn et al. | |
| 6,402,198 B2 | 6/2002 | Gollungberg | |
| 6,481,751 B1 | 11/2002 | Davis, Jr. et al. | |
| 6,843,237 B2 | 1/2005 | Bowen et al. | |
| 6,896,318 B2 | 5/2005 | Marrs et al. | |
| 7,137,474 B2 | 11/2006 | Yokote | |
| 7,189,040 B2 | 3/2007 | Sharp | |
| 7,270,209 B2 | 9/2007 | Suess | |
| 7,984,925 B2 | 7/2011 | Levin et al. | |
| 8,056,928 B2 * | 11/2011 | Ijaz | B60K 15/07 |
| | | | 280/830 |
| 8,381,955 B2 | 2/2013 | Grater et al. | |
| 8,905,170 B2 | 12/2014 | Kyoden et al. | |
| 9,061,584 B2 | 6/2015 | Vargo et al. | |
| 9,120,372 B2 | 9/2015 | Sloan et al. | |
| 9,227,582 B2 | 1/2016 | Katayama et al. | |
| 9,457,652 B2 | 10/2016 | Sloan et al. | |
| 10,017,037 B2 | 6/2018 | Newman et al. | |
| 10,081,243 B2 * | 9/2018 | Zimmerman | B60K 15/07 |
| 10,144,280 B2 | 12/2018 | Sloan et al. | |
| 10,369,884 B2 | 8/2019 | Sloan et al. | |
| 10,589,788 B1 | 3/2020 | Milton et al. | |
| 10,744,873 B2 | 8/2020 | Sloan et al. | |
| 10,864,859 B2 | 12/2020 | Sloan et al. | |
| 10,906,395 B2 | 2/2021 | Gibb et al. | |
| 2008/0067209 A1 | 3/2008 | Gunn | |
| 2008/0169139 A1 | 7/2008 | Kramer | |
| 2009/0114784 A1 | 5/2009 | Tam | |
| 2010/0065597 A1 | 3/2010 | Grater et al. | |
| 2011/0233353 A1 | 9/2011 | Palmer | |
| 2012/0080466 A1 * | 4/2012 | Schultheis | F17C 13/084 |
| | | | 224/400 |
| 2012/0090907 A1 | 4/2012 | Store et al. | |
| 2012/0161430 A1 * | 6/2012 | Mulanon | F17C 13/084 |
| | | | 280/834 |
| 2012/0228307 A1 | 9/2012 | Simmons | |
| 2013/0001384 A1 | 1/2013 | Karlsson et al. | |
| 2013/0199863 A1 | 8/2013 | Robbins | |
| 2013/0334381 A1 | 12/2013 | Vargo, Jr. et al. | |
| 2014/0137953 A1 | 5/2014 | Gibb et al. | |
| 2014/0175782 A1 | 6/2014 | Sloan et al. | |
| 2014/0367954 A1 | 12/2014 | McKinney et al. | |
| 2015/0108747 A1 | 4/2015 | Goedken | |
| 2015/0175353 A1 | 6/2015 | Gillmore et al. | |
| 2016/0023548 A1 | 1/2016 | Crist et al. | |
| 2016/0082910 A1 | 3/2016 | Sloan et al. | |
| 2016/0226041 A1 | 8/2016 | Jackson et al. | |
| 2017/0334288 A1 | 1/2017 | Rike et al. | |
| 2017/0057348 A1 * | 3/2017 | Arold | B60K 15/067 |
| 2017/0101003 A1 | 4/2017 | Zimmerman et al. | |
| 2018/0283610 A1 | 10/2018 | Wexler et al. | |
| 2020/0072315 A1 * | 3/2020 | Seno | B60K 5/1291 |
| 2020/0384854 A1 | 12/2020 | Sloan et al. | |

FOREIGN PATENT DOCUMENTS

| | | |
|---|---|---|
| EP | 2 065 247 A1 | 11/2008 |
| EP | 2 130 747 A2 | 12/2009 |
| EP | 2165875 A2 | 3/2010 |
| JP | H11-278069 A | 10/1999 |
| JP | 2005-138771 A | 6/2005 |
| JP | 2009-220680 A | 10/2009 |
| JP | 2010-100207 A | 5/2010 |
| KR | 19980035495 | 8/1998 |
| KR | 20170000950 | 1/2017 |
| WO | WO 2007/133213 A1 | 11/2007 |
| WO | WO 2012/087224 A1 | 6/2012 |
| WO | WO 2012/115622 A1 | 8/2012 |
| WO | WO 2014/063018 A1 | 4/2014 |
| WO | WO 2016/210329 A1 | 12/2016 |
| WO | WO 2018/135990 A1 | 7/2018 |
| WO | WO 2020/197856 A1 | 10/2020 |

* cited by examiner

FUEL SYSTEM MOUNTABLE TO A VEHICLE FRAME RAIL

CROSS-REFERENCE

This application is a continuation of PCT Application No. PCT/US2020/023154, filed Mar. 17, 2020, which claims the benefit of U.S. Provisional Application No. 62/822,439, filed Mar. 22, 2019. Each of the foregoing applications is hereby incorporated by reference in its entirety herein.

BACKGROUND OF THE INVENTION

Field of the Invention

This application relates to fuel systems that can be mounted to a lateral or side portion of a vehicle frame rail.

Description of the Related Art

Compressed natural gas (CNG) is an alternative fuel that provides many advantages. CNG fuels burn cleaner than other combustion fuels for vehicles. CNG also can be more cost effective.

CNG fuel systems can come in several forms. One form employs a Type IV fuel tank constructed with a polymeric liner. Carbon fiber wrapped around the liner can reinforce the liner, to produce a fuel tank strong enough for use on heavy-duty trucks and other vehicles. The fuel tank can have a boss sealing each of the end portion of the fuel tank. The boss can provide access to the fuel tank for filling and dispensing the fuel contained therein. A side mounted fuel system can include a frame to support the fuel tank on a side or lateral portion of a vehicle. Straps can support central portions of the fuel tank within the frame. Some fuel tanks also can be supported at one or both ends at the bosses.

SUMMARY OF THE INVENTION

While the side mounted fuel system is known, complications in mounting the fuel system can arise. Straps adds cost, complexity, and a failure mode to the fuel system. Also, other components are mounted to the lateral portion of the frame rail. So it can be challenging to locate the fuel system conveniently relative to these other components. A need exists to provide improved side-mounted fuel systems. There is a need for improved assemblies and systems that can be more flexibly connected to the frame rail, e.g., a two or more positions spaced along the frame rail. There is a need for improved assemblies and systems that support a fuel tank at a boss portion. Also, there is a need for an improved cab access system. These improvements can enable larger tanks to be supported to a lateral portion of a frame rail while not extending the width of the vehicle at the tank beyond acceptable limits.

In one embodiment, a fuel system is provided that includes a fuel system frame, a first bracket, and a second bracket. The fuel system frame has a first position and a second position spaced apart from the first position. The first bracket is configured to connect to the fuel system frame at the first position or at the second position to support the fuel system from either the first position or the second position. The second bracket has a first portion configured to mate with the first bracket and a second portion configured to connect to a vehicle frame rail.

The first position and the second position allow the first and second brackets to be located at any one of a plurality of different vehicle frame rail positions along the frame rail without requiring the movement of the fuel system frame.

The first position and the second position allow the fuel system to be located in any one of a plurality of different vehicle frame rail positions along the frame rail without requiring the movement of the second bracket.

In another embodiment, a fuel system is provided that includes a fuel tank and a support assembly. The fuel tank includes a central cylindrical portion, a first neck portion that has a first boss at a first end and a second neck portion that has a second boss at a second end. The support assembly is configured to connect the fuel system to a side portion of a frame rail of a vehicle. The support assembly has a first tank support portion, a second tank support portion, and a bracket system. The first tank support portion is configured to support the first neck portion of the tank. The second tank support portion is configured to support the second neck portion of the tank. The bracket system is coupled with the first tank support portion and the second tank support portion. The bracket system is configured to be coupled to a frame rail at a frame rail position longitudinally between the first neck portion of the fuel tank and the second neck portion of the fuel tank.

In some variations, the tank is not being directly supported at locations longitudinally between the first and second neck portions.

In another embodiment a fuel system is provided that includes a fuel tank, a frame, and a step support. The fuel tank has a central cylindrical portion, a first end and a second end opposite the first end. The frame has a frame rail connection portion disposed on a vehicle side of the fuel system and a tank support portion disposed around one or both of the first and second ends of the fuel tank. The step support is configured to apply a load to the central cylindrical portion of the fuel tank.

In some embodiments, a fuel system is provided that includes an access door on an end of the fuel system. The access door can be configured to be moved to provide access to three or more components within the fuel system. One of the three or more components can be a filter. For example, in some embodiments, the access door can provide access to a filter, a defuel assembly, and a bleed valve. In some embodiments, the access door can provide access to a filter, a cylinder valve assembly, and a bleed valve.

In some configurations the fuel system enclosure, e.g., cover, has an elongated side opening that provides access to one or more components. The components can be mounted to one or more modular frame members, e.g., plates. The elongate opening enables service access to one or more components that may be mounted in a modular way and accessible through the opening. For example, the same exterior enclosure with the elongate access opening can be used to enclose a wide range of internal component layouts while providing service, inspection and repair access to the components thereof. In one example, three modular frame members are provided, each with one or more serviceable component mounted thereto. The access opening can provide access to the components on all three modular frame members.

In another form, an enclosure is provided with an access door assembly having two stop positions. The assembly can have a first stop position corresponding to the door being rotated out of a position of covering an access opening. The assembly can have a second stop position corresponding to the door being rotated to a position of covering the access opening. In one of the positions, a hook comes to rest on a shaft of the access door assembly whereby the position of the door is restrained. The door can be fixed in the restrained position by actuating a door locking clamp.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

Figure 1:
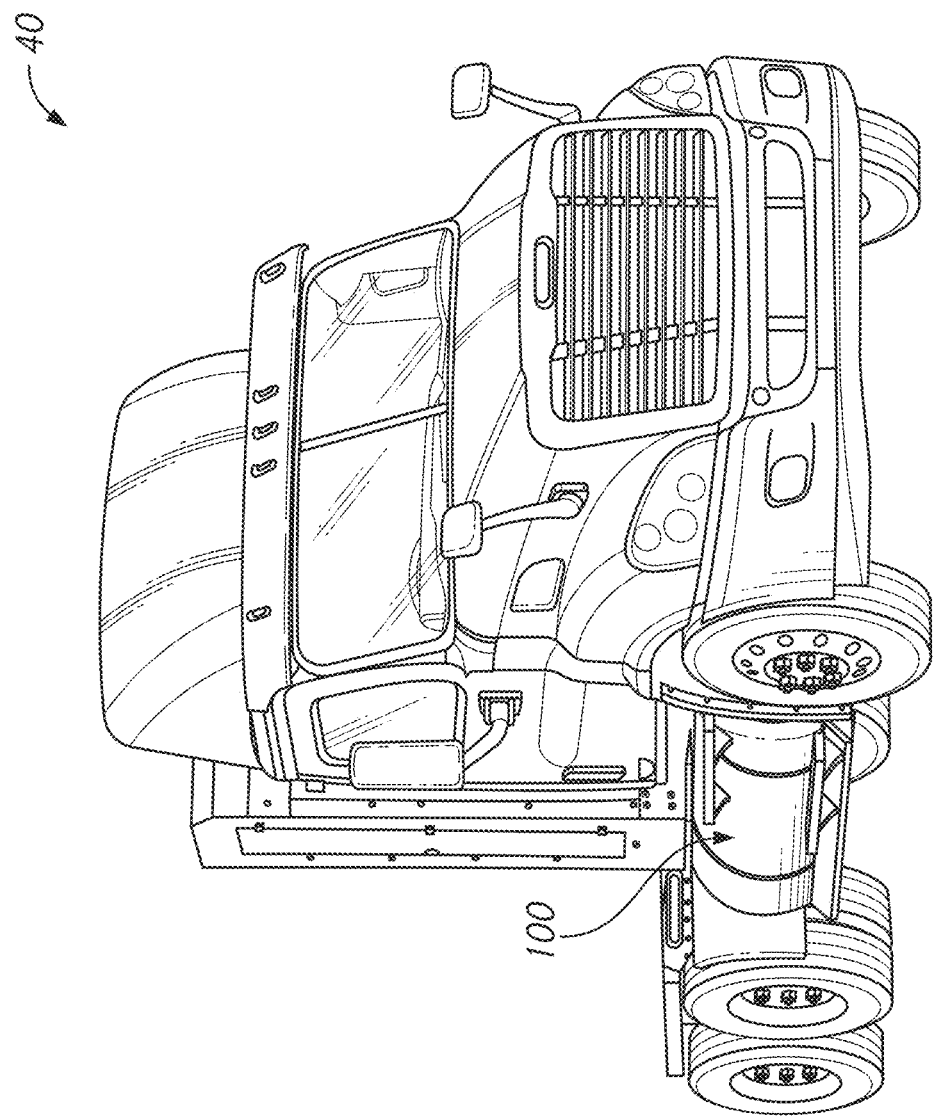
FIG. 1 is a perspective view of a cab of a heavy duty vehicle having a fuel system mounted to a side portion of a frame rail of the vehicle.

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses a number of improvements in a side mounted fuel system 100 that, in some embodiments, provides more options in mating or mounting the fuel system 100 to a frame rail 42 of a vehicle 40. See, e.g., FIG. 2 and Section I below. In some cases, the improvement provide enhanced neck mounting of a fuel tank 102 of the fuel system 100. See, e.g., FIGS. 11-12 and Section II below. In some cases, the improvements make better use of available space for vehicle access steps a large fuel tank 102. See, e.g., FIG. 13 and Section III below.

I. Support Assembly for Frame Rail Connections

Some embodiments of the fuel system 100 provide more options for how mounting the fuel system 100 to a vehicle 40. The vehicle 40 can be or include a portion of a heavy-duty vehicle, such as a tractor unit for forming a tractor-trailer. The vehicle 40 includes a frame rail 42 that supports various components, such as forward wheels, rearward wheels, and a cab. The frame rail 42 can include a rigid member formed into a shape providing enhanced strength, such as having an I-beam or a C shaped cross-section configuration. A C-shaped frame rail 42 can have a long side 44 facing away from a center of the frame rail 42 and short sides at a top and a bottom side thereof. The side 44 faces away from a central, vertical forward-rearward plane. The side 44 can be equipped to support the fuel system 100 as well as a number of other components.

Figure 2:
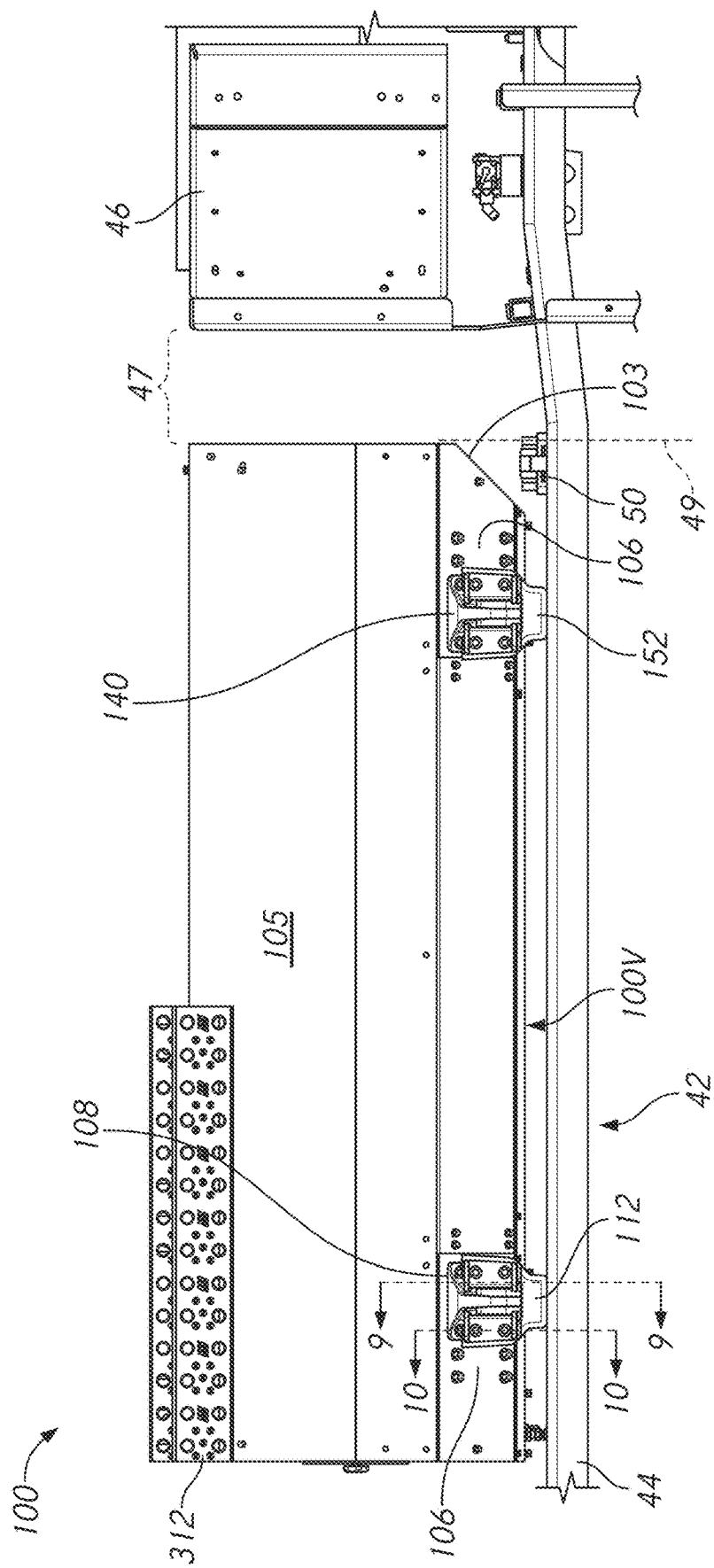
FIG. 2 is a top view of a portion of a vehicle frame rail of a vehicle chassis having a fuel system according to one embodiment coupled to a lateral portion of the frame rail.

FIG. 2 shows an example of how the fuel system 100 and other components can be mounted to the frame rail 42. The fuel system 100 accommodates these other components to make better use of restricted space and/or to provide compact configurations. For example, a fender 46 can be disposed at least partially over front wheels of the vehicle 40. In one embodiment, a gap 47 separates a forward face of the fuel system 100 from a rearward edge of the fender 46. A bracket assembly described below can adjust the gap 47. As a further example, a shackle 50 coupled to the frame rail 42 can be configured to support a shock absorber. The shock absorber configuration and/or the geometry of the vehicle 40 can limit a desired position for the shackle 50.

The mounting location of the fuel system 100 can be shifted to better accommodate these other vehicle components. Also, the bracket assembly component of the fuel system 100 to be shifted even if the rest of the fuel system 100 is not shifted to accommodate these other components.

A. Frame Rail Mounting Location Adjustment

FIGS. 2, 3, 5, and 11 show further aspects of mounting location for the fuel system 100. The fuel system 100 includes the fuel tank 102 that is supported by a support assembly, e.g. a fuel system frame 104. The fuel system frame 104 can also include a frame rail connection portion 106 that can couple with a portion of a bracket assembly in a number of different positions. The frame rail connection portion 106 is provided on a vehicle side 100V of the fuel system 100. The frame rail connection portion 106 can have a grid of mount features, which can include a plurality of mounting holes as discussed further below. The plurality of mounting holes enables greater flexibility in placement of the brackets used to connect the fuel system 100 to the frame rail 42. The plurality of mounting holes enables greater flexibility in placement of the fuel system 100 on the frame rail 42. The plurality of mounting holes enables greater flexibility in placement of the fuel system 100 or the brackets along the frame rail 42. The fuel system 100 also includes a cover 105 that in combination with the fuel system frame 104 encloses a space around the fuel tank 102.

Figure 3:
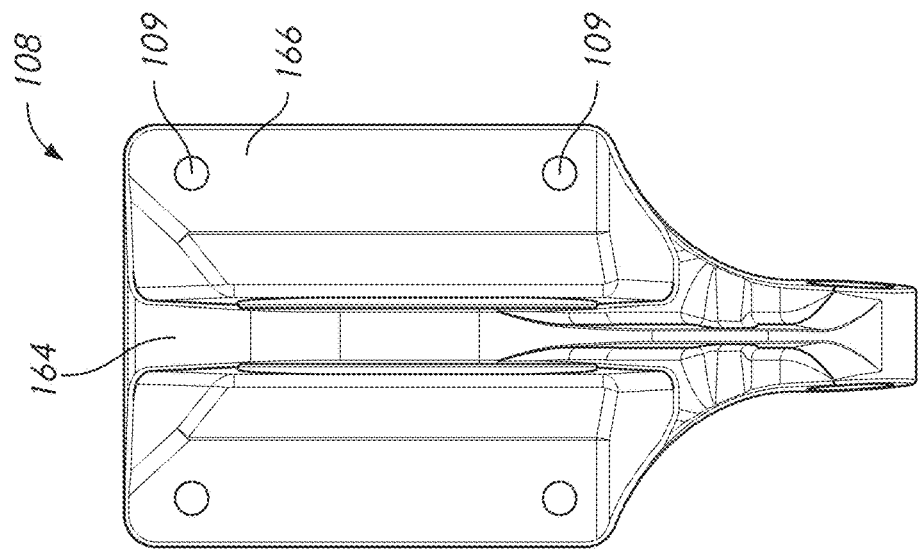
FIG. 3 is a disassembled view of a portion of a fuel system bracket and a portion of a fuel system support assembly that has a plurality of connection positions.
Figure 3:
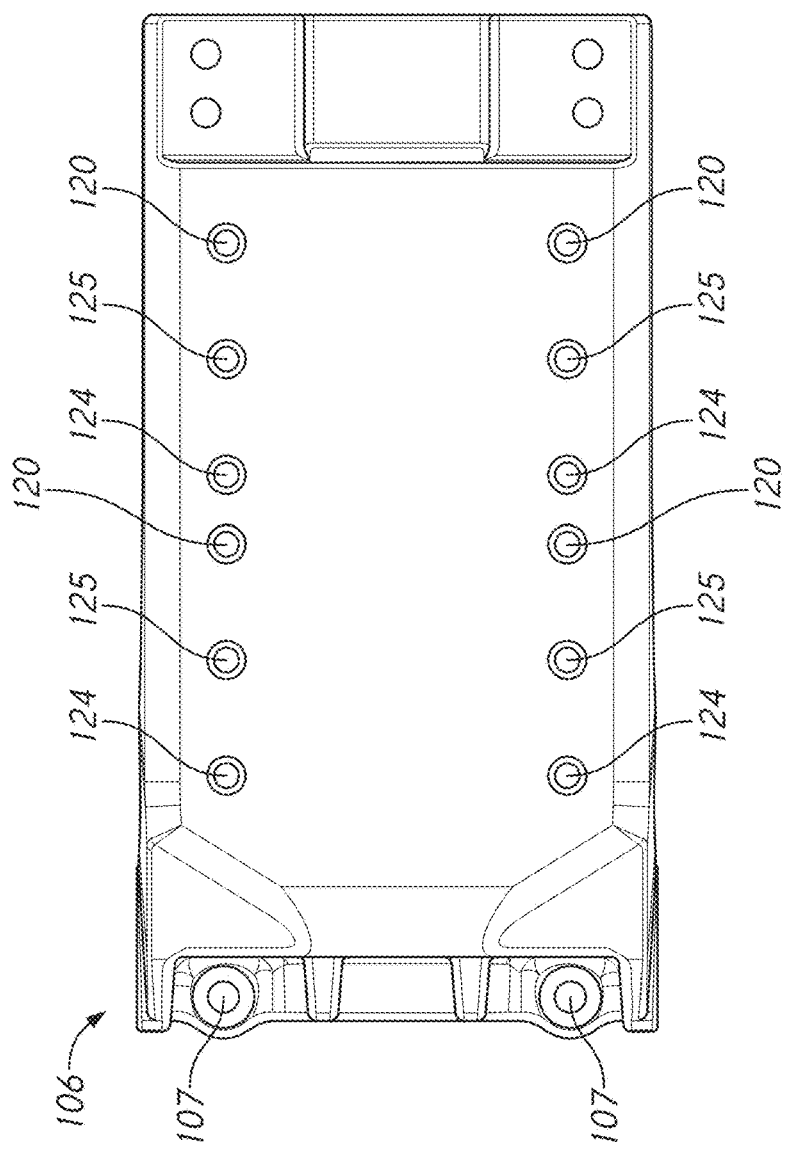

FIGS. 2, 3 and 6-8 show details of a first bracket 108 and the connection thereof to the frame rail connection portion 106 at a rearward portion of the fuel system 100. In one embodiment, the frame rail connection portion 106 is able to couple with a first bracket 108 in more than one position. The first bracket 108 can be coupled to a second bracket 112 to mount the fuel system 100 to the frame rail 42 as discussed further below. FIG. 3 shows that in one example, the frame rail connection portion 106 can have an array of holes that allows the first bracket 108 to couple to the frame rail connection portion 106 in a plurality of discrete predefined positions. A first frame rail connection portion 106 can be coupled to a rearward position of the fuel system 100 in the orientation shown in FIG. 3 and a second frame rail connection portion 106 can be coupled to a forward position of the fuel system 100. The second frame rail connection portion 106 toward the forward position can be in an inverted orientation (rotated 180 degrees about an axis into and out of the page). As a result, mounting features 107 (e.g., fastener holes) of the rearward frame rail connection portion 106 can be located toward the rear of the fuel system 100 and the mounting features 107 of the forward frame rail connection portion 106 can be located toward the front of the fuel system 100.

A first position 120 can be provided by a subset of the holes on the frame rail connection portion 106. For example a pair of holes located toward a forward end of the array of holes, one above the other, can in part define the first position 120. The forward pair of holes can be located at a common longitudinal positon of the frame rail connection portion 106. A second pair of holes can in part define the first position 120. The second pair of holes of the first position 120 can be located at a common longitudinal position of the frame rail connection portion 106 spaced apart from the first pair of holes of the first position 120. The first position 120 includes in this embodiment as a set of four holes including a forward most pair of holes on the frame rail connection portion 106. This configuration allows the frame rail connection portion 106 to be coupled with the first bracket 108 at a forward-most position of the frame rail connection portion 106. Although the first position 120 can include four holes, in some embodiments the first position 120 can include more or fewer holes than four holes, can include a different arrangements of holes, and can include positions along one or more slots as described further below. This can allow the first bracket 108 and a second bracket 112 coupled therewith to be located forward relative to a second position 124 defined by a set of holes of the array of holes on the frame rail connection portion 106.

In one embodiment, the second position 124 is defined by a pair of holes disposed toward the rearward end of the frame rail connection portion 106. The pair of holes of the second position 124 disposed toward the rearward end can be disposed at a common longitudinal position of the frame rail connection portion 106. The second position 124 can be further defined by a second pair of holes spaced forward of the first pair of holes of the second position 124. The second pair of holes of the second position 124 can be located forward of, and in the illustrated example immediately adjacent to, the rearward pair of holes of the first position 120. Although the second position 124 include four holes, the second position 124 could include more or fewer holes than four holes, can include different arrangements of holes, and can include positions along one or more slots as described further below.

The frame rail connection portion 106 can define a third position 125 between the first position 120 and the second position 124. The third position 125 can be defined in part by a pair of holes located rearward of, e.g., in one case immediately adjacent to, the forward holes of the first position 120. The third position 125 can be further defined by a second pair of holes located rearward of, e.g., immediately rearward of, the rearward holes of the first position 120. Although the third position 125 include four holes, the third position 125 could include more or fewer holes than four holes, could include different arrangements of holes, and could include positions along one or more slots as described further below. Although three positions are illustrated in the frame rail connection portion 106, in other embodiments there can be more or fewer positions defined by discrete, predefined holes in the frame rail connection portion 106. The positions 120, 124, and 125 can also be forward, rearward and intermediate in a second frame rail connection portion 106 which can be inverted and can be located toward the forward end of the fuel system 100 as discussed above.

The distance between the positions 120, 124, 125 can be any suitable distance. For distance from the forward pair of holes of the first position, 120 to the forward pair of holes of the second position 124 can be 100 mm in one embodiment. The distance from the second position 124 to the third position 125, e.g., from the forward pair of holes of the first position 124 to the forward pair of holes of the second position 125 can be 50 mm in one embodiment. These distances can be uniform or can vary from one position to the next. For example, the distance from the forward pair of holes of the first position 120 to the forward pair of holes of the second position 124 can be any of 200 mm, 150 mm, 100 mm, 50 mm, 25 mm or more or less. The distance from the second position 124 to the third position 125, e.g., from the forward pair of holes of the first position 124 to the forward pair of holes of the second position 125 can be any of approximately 160 mm, 155 mm, 152 mm, 143 mm, 126 mm, 100 mm, 75 mm, 70 mm, 61 mm, 50 mm, 32 mm, 25 mm, or 12 mm. The distance from the second position 124 to the third position 125 can be three-quarters, two-thirds, one-half, one-third or one-quarter of the distance from the first position 120 to the second position 124.

FIG. 3 can further illustrate the positioning of a bracket assembly relative to the frame rail connection portion 106. A first bracket 108 can include a portion illustrated in FIG. 3 that is configured to be coupled with the frame rail connection portion 106. The portion of the first bracket 108 can include a central flange 164. The central flange 164 can project away from a bracket mounting base 166 that can include a plurality of mounting holes 109. The mounting holes 109 can be arranged to match the holes corresponding to one or more position of the frame rail connection portion 106. For example, the mounting holes 109 can be arranged in an array that includes a pair of mounting holes 109 on a first side of the central flange 164 and a pair of mounting holes 109 on a second side of the central flange 164 opposite the first side. Thus, the mounting holes 109 can be aligned over the holes of the first position 120 and fasteners can be used to secure the bracket mounting base 166 to the frame rail connection portion 106.

Advantageously, the groups of holes forming the first position 120, the second position 124, and the third position 125 can all be arranged at the same spacing as the mounting holes 109 such that the bracket mounting base 166 can be aligned with the holes of any of these positions.

As noted above, the fuel system frame 104 can include the frame rail connection portion 106 located toward a rearward portion of the fuel system 100. The fuel system frame 104 can also include a second frame rail connection portion 106 located toward a forward portion thereof. A structural member 256 can couple the two frame rail connection portion 106 together or they can be formed on a single unitary frame member. The forward frame rail connection portion 106 can have the same or a similar configuration as the rearward frame rail connection portion 106, e.g., with an array of holes defining a plurality of discrete spaced apart positions. The forward frame rail connection portion 106 can be coupled with bracket mounting base 166 of a third bracket 140, the third bracket 140 configured to couple with a fourth bracket 152 to form a second bracket assembly to couple the fuel system 100 to the frame rail 42.

The holes in the frame rail connection portions 106 (forward and rearward) enable several types of mounting configurations. For example, in one case, the longitudinal position of the fuel system 100 along the frame rail 42 can be determined. For example, the desired gap 47 can be provided between a forward portion of the fuel system 100 and an adjacent component, such as the fender 46. In another example, the vehicle side 100V of the fuel system 100 can be disposed at least partially over a low profile component, such as the shackle 50. Potential interference at the forward end of the fuel system 100 with other components on the frame rail 42 can be determined. In one example, securing the third bracket 140 to the frame rail connection portion 106 in the first position 120 would result in interference with another such component. The third bracket 140 can be moved to the second position 124 or the third position 125 of the forward frame rail connection portion 106. This allows the fourth bracket 152 to move to a frame rail position corresponding to the second position 124 or the third position 125 out of interfering position with such other component.

FIG. 2 shows the third bracket 140 in the second position 124 of the forward frame rail connection portion 106. FIG. 3 shows that in the case of the rearward frame rail connection portion 106 the first position 120 is a forward position, the second position 124 is a rearward position, and the third position 125 is an intermediate position between the forward and rearward positions. In in the case of the forward frame rail connection portion 106, the second position 124 is also the rearmost position of the forward frame rail connection portion 106. For the forward frame rail connection portion 106 the second position 124 is the position farthest from the mounting features 107. The position of the first bracket 108 on the rearward frame rail connection portion 106 can also be selected to avoid interference with other components on the frame rail 42. In the illustrated embodiment, the bracket mounting base 166 of the first bracket 108 can be secured to the fuel system 100 at the first position 120, forward of the other positions 124, 125. This enables the rearward bracket assembly including the first bracket 108 and the second bracket 112 to move forward out of a potentially interfering position with other component on the frame rail 42. One can see from the foregoing description that a number of permutation is possible. In the illustrated embodiment, there are nine permutations that are possible for positioning the first bracket 108 and the third bracket 140. These positions can result in corresponding shifting of the second bracket 112 and the fourth bracket 152 as needed to provide convenient connection, e.g., out of interference with other components connected to the frame rail 42.

Figure 3A:
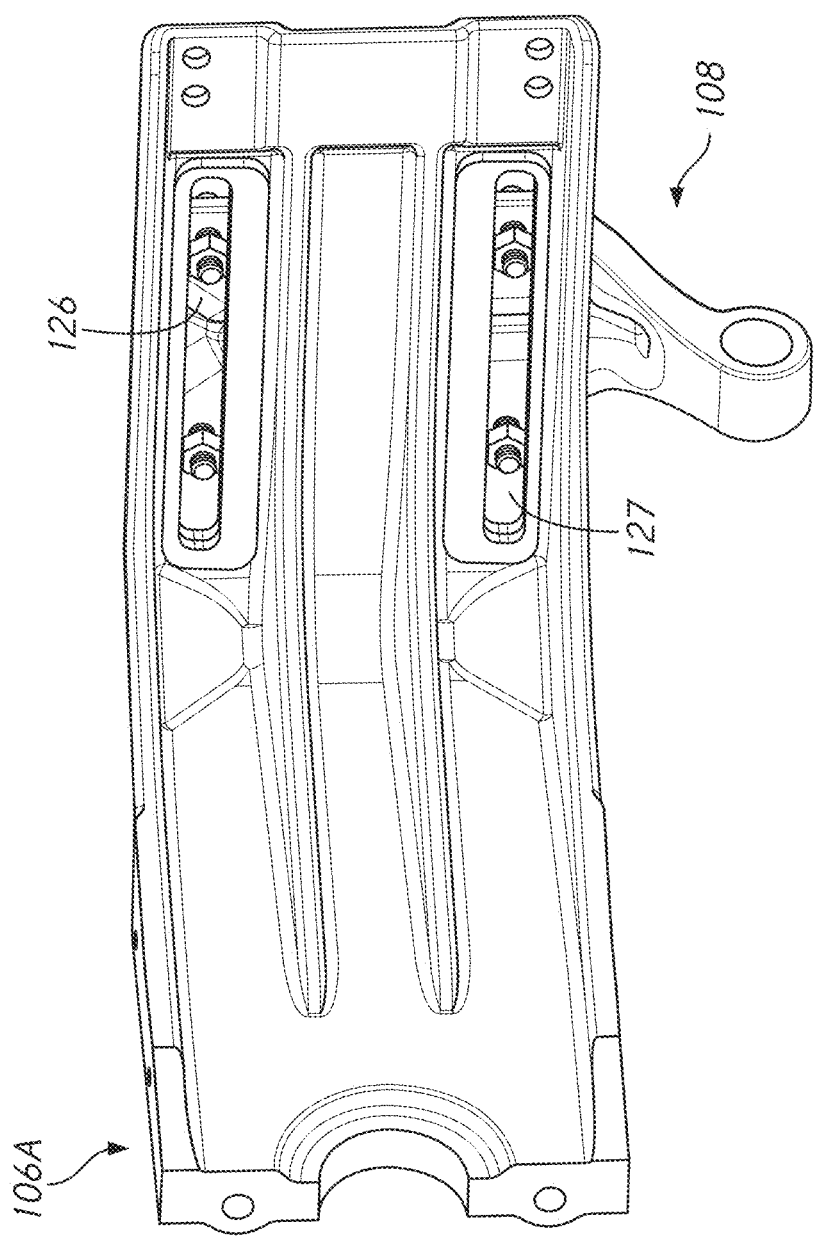
FIGS. 3A-3B show a tank-side and frame rails side views, respectively, of a bracket assembly including a bracket portion and a fuel system support assembly portion having a continuous range of connection positions.
Figure 3B:
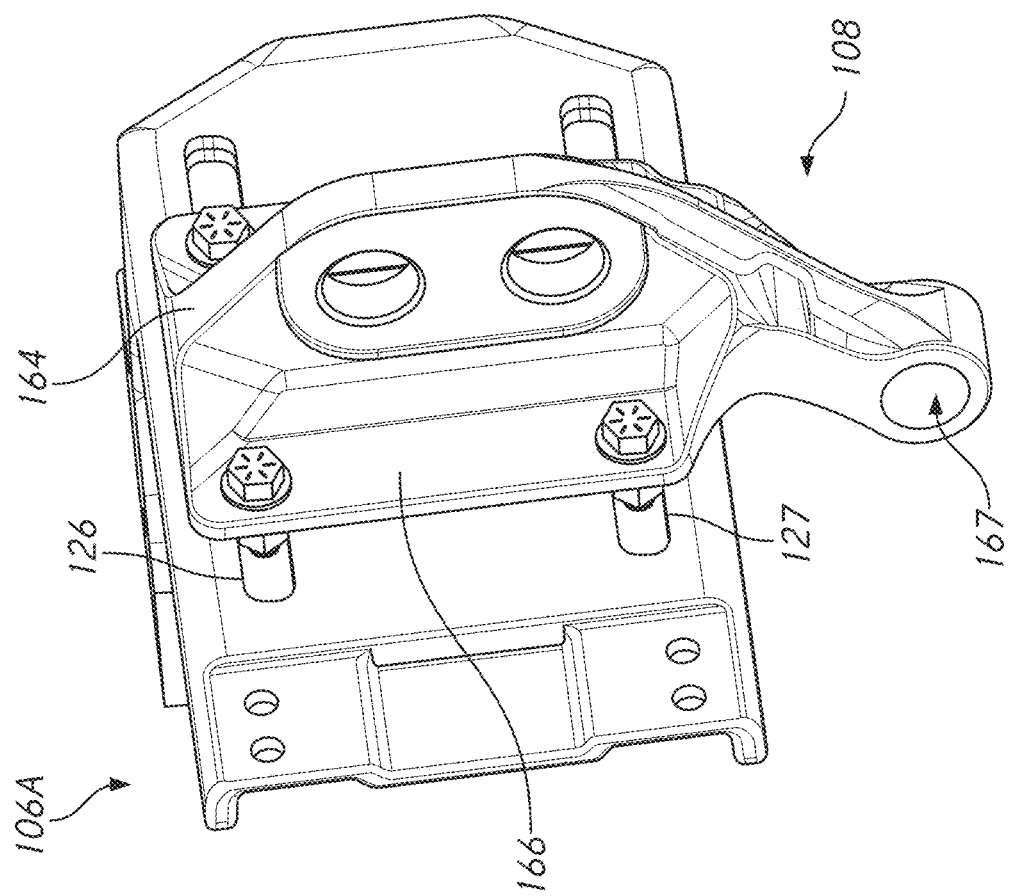

FIGS. 3A and 3B illustrate another embodiment of a frame rail connection portion 106A that can be integrated into the fuel system frame 104. The frame rail connection portion 106A can facilitate adjustment along a continuous range of positions that are not predefined within the range. The frame rail connection portion 106A enables connection of the bracket mounting base 166 of the first bracket 108 or of the third bracket 140 to the rearward frame rail connection portion 106A and to the frame rail connection portion 106A. In one embodiment, the frame rail connection portion 106A includes a first slot 126 and a second slot 127. The first slot 126 can be located generally above the second slot 127, e.g., extending parallel to the second slot 127. Fasteners disposed through the mounting holes 109 of the bracket mounting base 166 of the first bracket 108 can be located at any position along the first slot 126 and second slot 127.

The position of the first bracket 108 can be defined by initially loosely coupling the first bracket 108 to the frame rail connection portion 106A at the first slot 126 and/or the second slot 127, e.g., by bolts or other fasteners. The position of the first bracket 108 can be refined by sliding the first bracket 108 along the frame rail connection portion 106A to reach a user-defined position that is beneficial, e.g., that avoids interference as needed. This allows positioning of a bracket assembly including the first bracket 108 to be selected during mounting to the vehicle 40 at any such position. In a fuel system frame 104 that includes forward and rearward frame rail connection portion 106A, the third bracket 140 also can be coupled and positioned in this manner, allowing the end user to select the positions along the first slot 126 and second slot 127 during mounting of the fuel system 100 to the vehicle 40.

B. Bracket Assemblies Providing Fastenerless Secure Connections

FIGS. 4-10 illustrate bracket assemblies that provide convenient connection during fuel system-to-vehicle assembly. These bracket assemblies provide secure connections without requiring the bracket interface to be further secured by bolts or other similar fasteners. Such fasteners can be provided prior to final shipment.

Figure 4:
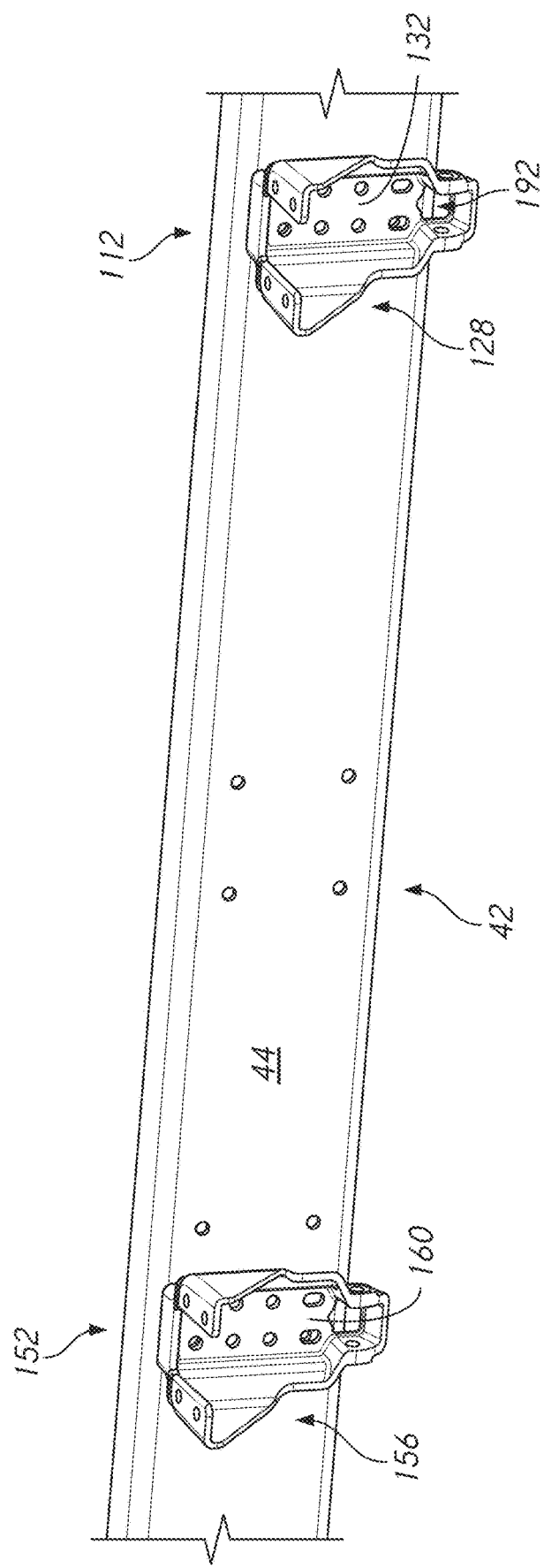
FIG. 4 is a perspective view of a frame rail and bracket assembly for mounting a fuel system according to one embodiment.

FIG. 4 shows that in one assembly a plurality of, e.g., two vehicle-side bracket assembly portions can be coupled to the frame rail 42. The second bracket 112 can be secured to the side 44 of the frame rail 42 forward of the fourth bracket 152. The second bracket 112 can form a portion of a rearward bracket assembly with the first bracket 108. The fourth bracket 152 can form a portion of a forward bracket assembly with the third bracket 140. The brackets 112, 152 have similar construction so the description of each one applies to the other. The second bracket 112 includes a first portion 128 and a second portion 132. The second portion 132 facilitates connection to the side 44 of the frame rail 42. For example, the second portion 132 can have an array of mounting holes that can receives fasteners to be secured across the frame rail 42. The first portion 128 can be a continuous member with, the second portion 132 or can be part of an assembly therewith. The first portion 128 can allow the first bracket 108 to be lowered onto the second bracket 112. The first portion 128 can support the first bracket 108 so that the fuel system 100 coupled therewith is retained on the frame rail 42. A flange member can be provided on the first bracket 108 can come to rest on top of the second portion 132 of the second bracket 112. A portion of the first bracket 108 can come to rest against a lower surface of the second portion 132 of the second bracket 112. The fourth bracket 152 can have a first portion 156 similar to the first portion 128 and a second portion 160 similar to the second portion 132.

Figure 5:
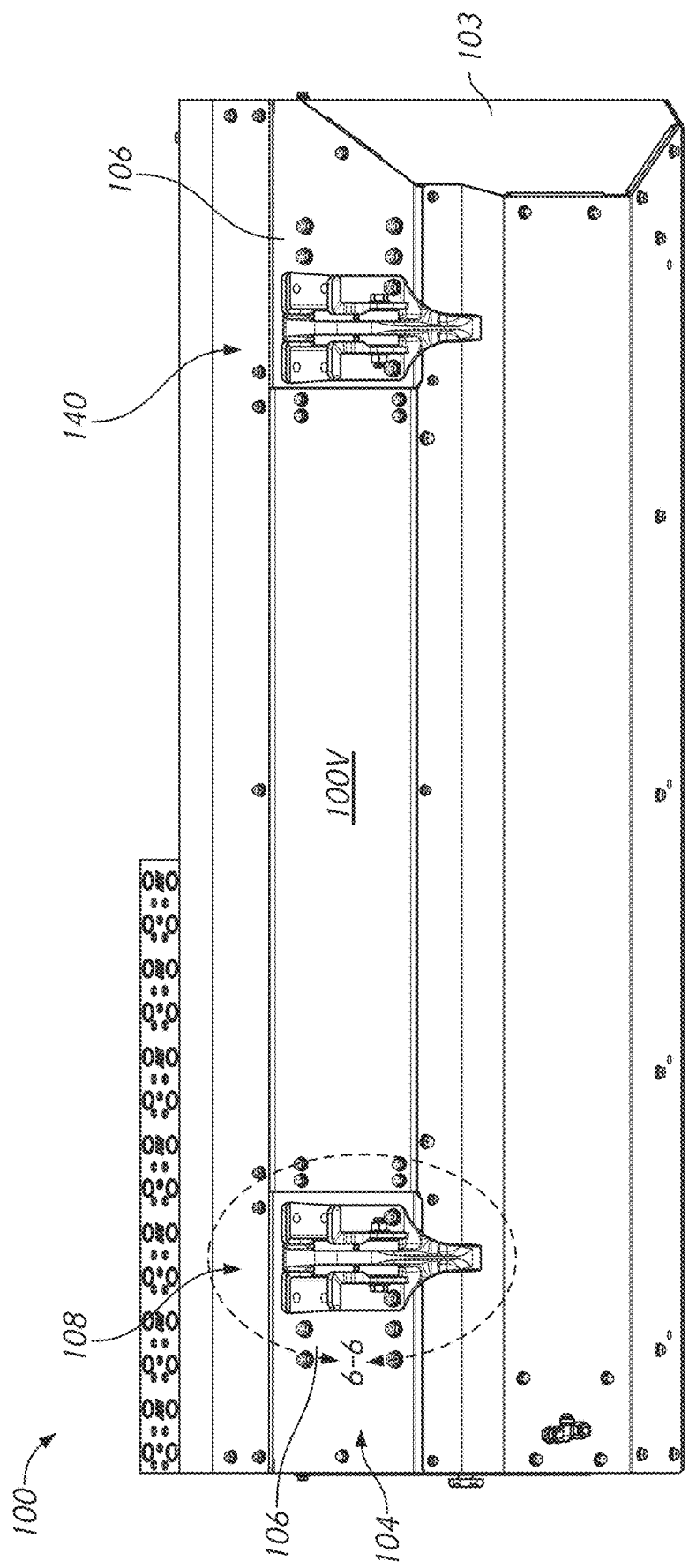
FIG. 5 is a vehicle side view of a fuel system and bracket assembly according to one embodiment.
Figure 6:
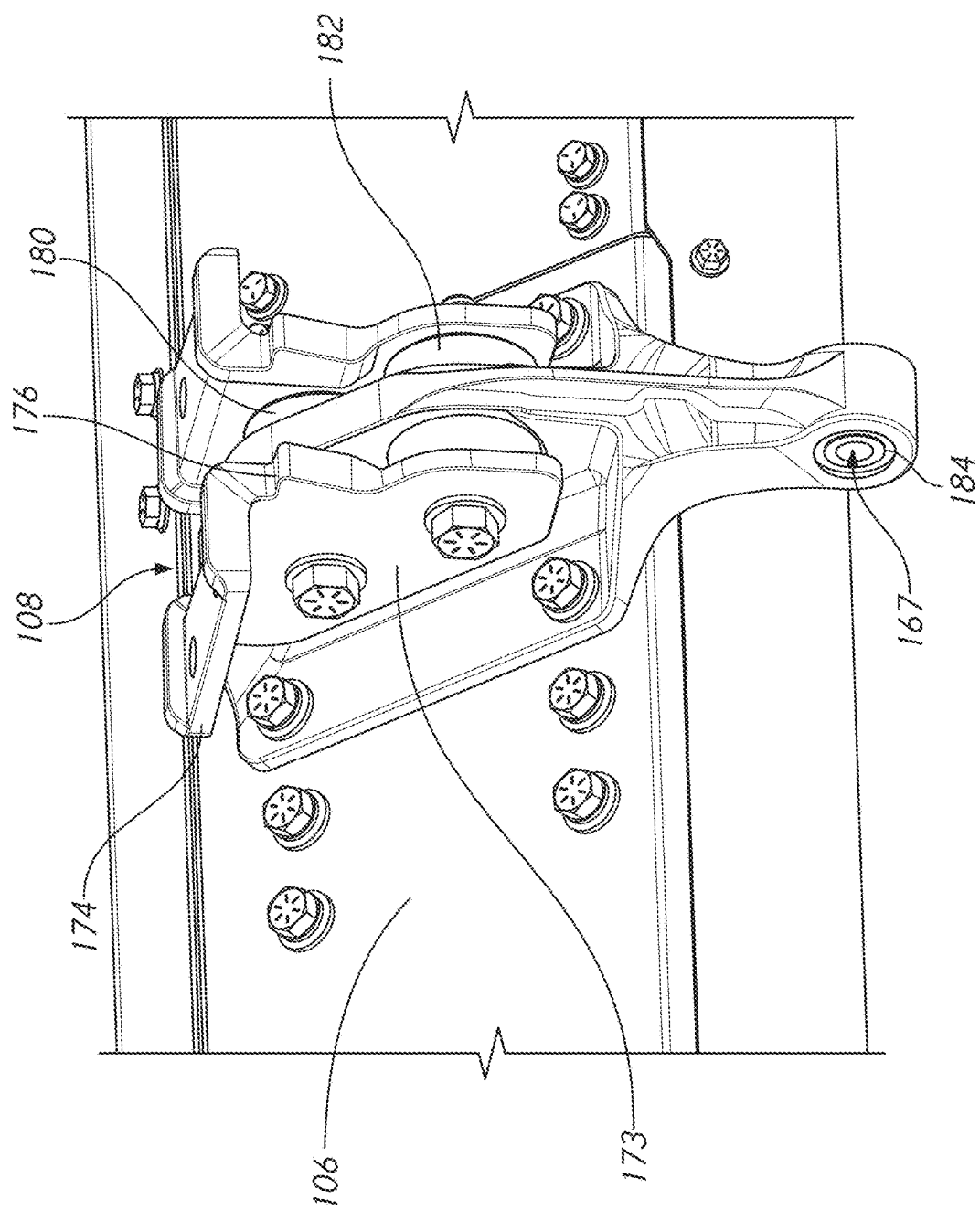
FIG. 6 shows detail 6-6 of the fuel system and bracket assembly of FIG. 5.

FIGS. 5-6 show details of the first bracket 108. The first bracket 108 can be located rearward of the third bracket 140 on the vehicle side 100V of the fuel system 100. The position of each of the brackets 108, 140 can be selected by the user, e.g., based on the desire to avoid interference with other components, as discussed above. In the illustrated embodiment, the first bracket 108 is in the first position 120 of the rearward frame rail connection portion 106 and the third bracket 140 is in the second position 124 of the forward frame rail connection portion 106. The third bracket 140 can have the same construction as the first bracket 108.

FIG. 6 shows the structure of the first bracket 108 in more detail. The first bracket 108 includes a body including the central flange 164 and the bracket mounting base 166. The bracket mounting base 166 can include a generally planar side configured to be secured against the frame rail connection portion 106. The central flange 164 can extend away from a side of the bracket mounting base 166 opposite the side configured to mate with the frame rail connection portion 106. The central flange 164 can have opposite sides that face forward and rearward when the first bracket 108 is mounted to the frame rail connection portion 106 and to the frame rail 42. The first bracket 108 can include a mounting portion for coupling the first bracket 108 to the second bracket 112. The mounting portion can include a bracket aperture 167 disposed along an axis extending between the opposing sides of the central flange 164. The bracket aperture 167 provides a point of connection between the first bracket 108 and the second bracket 112 as discussed further below.

The first bracket 108 includes first and second support wings 168, 172. The support wings can have similar, e.g., mirror image, configurations. The first support wing 168 can include a mount portion 173 and a vertical support 174. The mount portion 173 and vertical support 174 form a flange configuration for resting on top of the second portion 132 of the second bracket 112. The mount portion 173 is configured to extend along a forward side of the central flange 164.

The mount portion 173 can be secured adjacent to the central flange 164 through one or more resilient members, e.g., vibration dampers. The vertical support 174 can extend rearward from an upper portion, e.g., the top of, the mount portion 173. The vertical support 174 can be configured to rest on top of a portion of the second bracket 112 in a predefined position when the first bracket 108 and the second bracket 112 are connected. The position can be defined at least in part by a transverse motion limit structure. In one embodiment, at least the vertical support 174 includes a configuration to resist bending. For example, the cross-section of the vertical support 174 can have a one or more flanges that extend away from the loading surface, where forces are applied between the vertical support 174 and the second bracket 112. The flanges act in a manner similar to an I-beam to enhance the stiffness of the first support wing 168. The flanges can be seen as areas of greater height at the vehicle facing side and at the fuel system facing side of the first support wing 168.

The first support wing 168 also can include a rotational support 176. The rotational support 176 can include a projection configured to rest against a lower portion, e.g., surface, of the second bracket 112. The rotational support 176 can help to enable the fuel system 100 to be supported on the frame rail 42 with the force of gravity being countered at least in part through the rotational support 176. The weight is further supported through the first support wing 168 and the second support wing 172. A clearance is provided between a top surface of the rotational support 176 and a bottom surface of the vertical support 174 to receive the first portion 128 of the second bracket 112. This is described in greater detail below in connection with FIGS. 7-10.

The connection between the first support wing 168 and the second support wing 172 and the central flange 164 can be through a resilient member, such as a damper or a vibration isolator. FIG. 6 shows that a first resilient member 180 provided between the first support wing 168 and the central flange 164. The first resilient member 180 can be configured as a stepped cylinder having a smaller diameter section on a central portion of the outside surface there. The first resilient member 180 can have larger diameter section on ends thereof on both sides of the central portion. The larger diameter section of one end of the first resilient member 180 can be disposed between opposing surfaces of the first support wing 168 and the central flange 164. The larger diameter section of another end of the first resilient member 180 can be disposed between opposing surfaces of the second support wing 172 and the central flange 164. As shown, bolts can be disposed through the first resilient member 180 and the second resilient member 182 to secure the first support wing 168 to the central flange 164. The first resilient member 180 and the second resilient member 182 are resilient, e.g., compressible, such that loads applied during operation of the vehicle 40 from the road are not directly transferred to the fuel system 100 but rather are absorbed to some extent and modulated in the first resilient member 180 and the second resilient member 182. In one variation, the first resilient member 180 and the second resilient member 182 can be combined providing a single member with multiple aperture for securing the wings to the central flange 164.

A third resilient member 184 provided in the bracket aperture 167 modulates similar loads that could be applied through the point of connection at the bracket aperture 167 between the first bracket 108 and the second bracket 112. In one modified embodiment, connection at the bracket aperture 167 can be provided without any vibration isolation or damping, e.g. by directly bolting the first bracket 108 to the second bracket 112 at this location. In a further modified embodiment, the first resilient member 180 and the second resilient member 182 can be eliminated. The connection points between the first and/or second support wing 168, 172 can be rigid e.g., direct connection without intervening resilient members.

Figure 9:
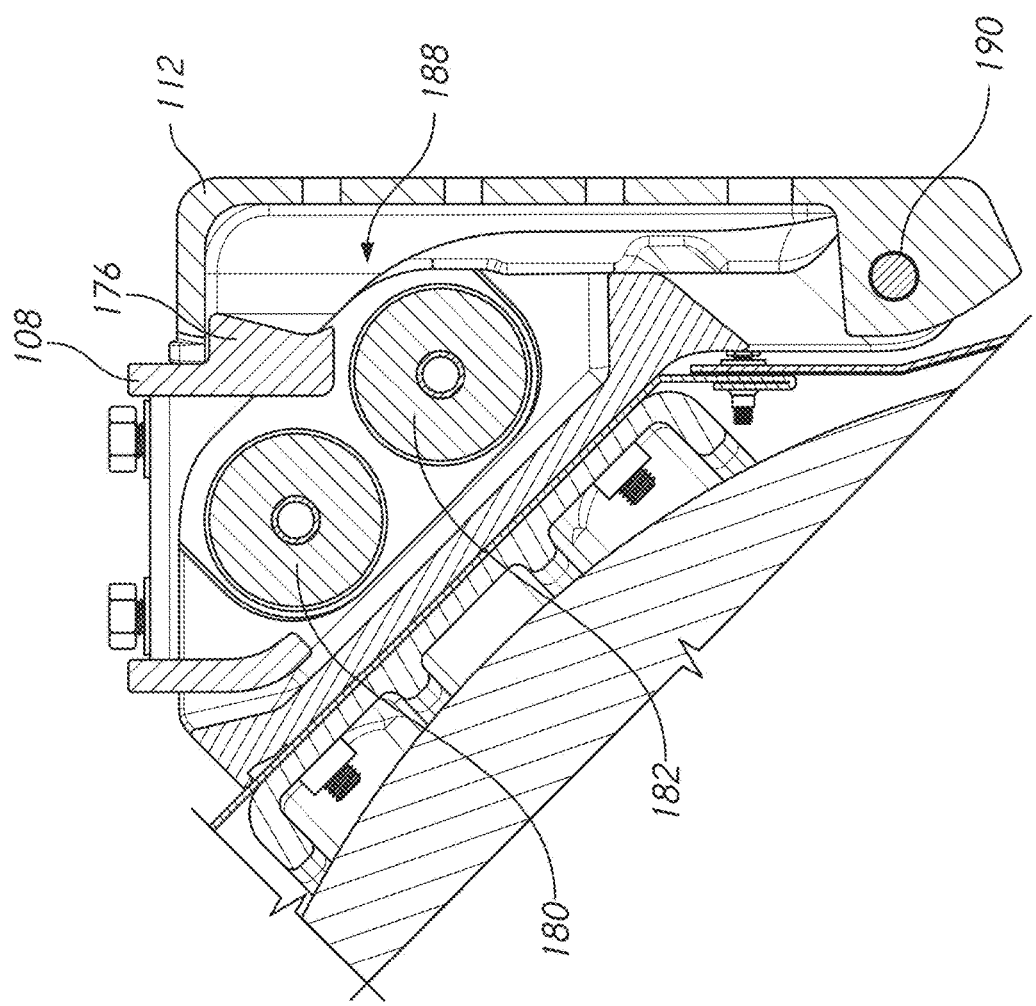
FIG. 9 is a cross-section of the bracket assembly of FIG. 2 taken at the section plane 9-9 showing an elevation support of a fuel system bracket.
Figure 10:
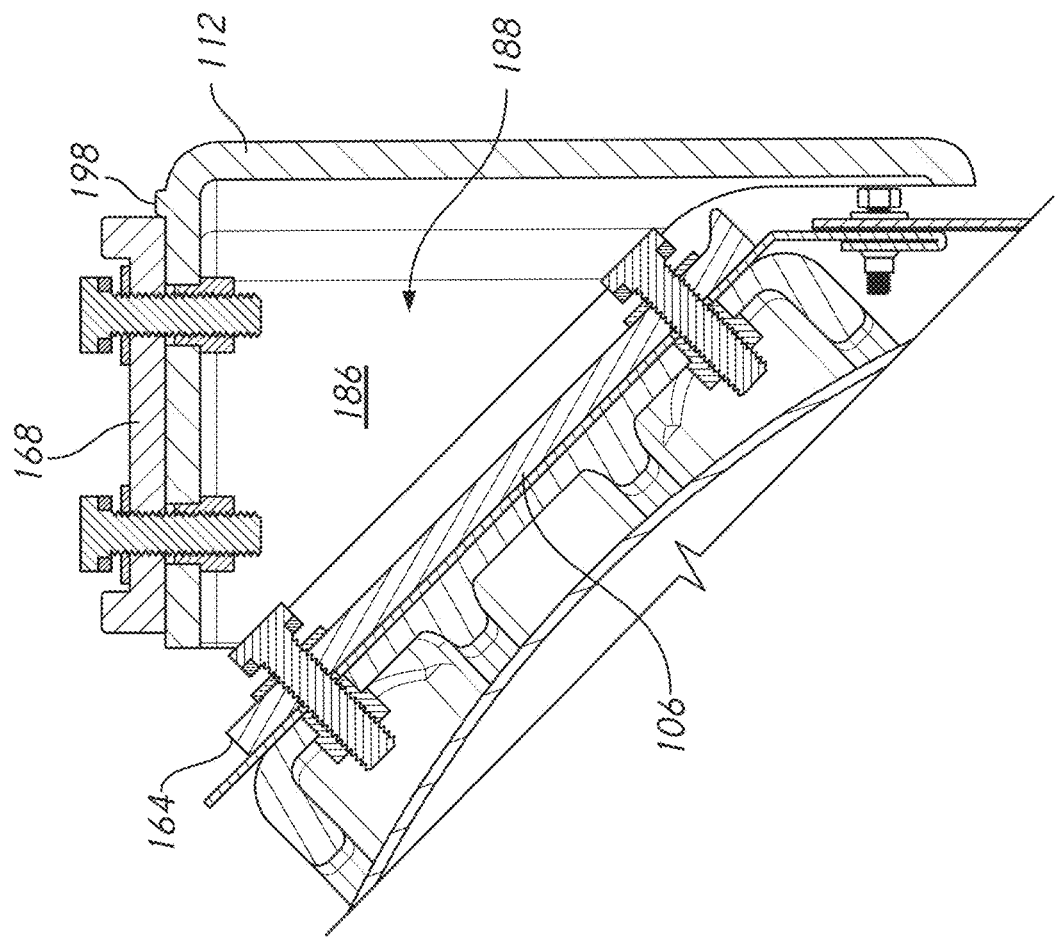
FIG. 10 is a cross-section of the bracket assembly of FIG. 2 taken at the section plane 10-10 showing a transverse motion limit portion of a frame rail bracket.

FIGS. 4, 9 and 10 illustrate aspects of the second bracket 112. In one embodiment, the second bracket 112 and the fourth bracket 152 have the same construction. So, description of either the second bracket 112 or of the fourth bracket 152 applies to the other these two brackets. The second bracket 112 includes a first portion 128 and a second portion 132, as discussed above. The first portion 128 can include a generally planar structure at least on a side configured to face the side 44 of the frame rail 42. The first portion 128 can have one or a plurality of apertures for securing the second bracket 112 to the frame rail 42 using fasteners. The second bracket 112 can have a vertical support 186 on each of a forward and a rearward side of an internal space 188 disposed on a lateral side of the second bracket 112. The internal space 188 can be disposed on a side opposite the side of the second bracket 112 that faces the side 44 of the frame rail 42 when the second bracket 112 is coupled thereto.

The vertical supports 186 can be formed flanges of the second bracket 112 located forward and rearward of the internal space 188. The internal space 188 can be configured, e.g., sized and shaped, to receive the central flange 164 and the mount portion 173 of the first bracket 108. The vertical supports 186 can be configured to reside immediately below and in contact with the first support wing 168 and the second support wing 172 when the first bracket 108 is mated with the second bracket 112. The vertical support 186 can have a geometry to enhance stiffness, e.g., with a support flange disposed beneath the vertical support 186 in contact with the second portion 132.

The second bracket 112 can include a transverse motion limiter 196 configured to control the position of the first bracket 108 relative to the second bracket 112 when these brackets are assembled together. The transverse motion limiter 196 can include one or more, e.g., two, ridges 198 disposed along a top surface of the vertical support 186. The ridges 198 can have a height of about 0.1 inch. In some embodiments, the ridges 198 have a height of 0.2 inch, 0.3 inch, 0.4 inch, 0.5 inch, 0.6 inch, 0.7 inch, or more than 0.7 inches. The ridges 198 can have a height that is 5% of the thickness of the first support wing 168 or the second support wing 172 in a vertical direction, e.g., of the transverse stiffening structure of the support wing. The ridges 198 can have a height that is 10% of the thickness of the first support wing 168 or the second support wing 172 in a vertical direction. The ridges 198 can have a height that is 25% of the thickness of the first support wing 168 or the second support wing 172 in a vertical direction.

The support wings 168, 172 and the vertical supports 186 can allow the fuel system 100 to be mounted to the frame rail 42 during assembly without any additional fasteners. The support wings 168, 172 and the vertical supports 186 can have apertures for allowing bolts to more permanently connect the second bracket 112 to the first bracket 108, as discussed further below. The second bracket 112 also can include a bracket aperture 190 configured to be aligned with the bracket aperture 167 when the brackets are assembled. The alignment of the bracket aperture 190 on the second bracket 112 and the bracket aperture 167 on the first bracket 108 can be facilitated by a clearance gap 192 formed through the second bracket 112. The clearance gap 192 can allow a portion of the body of the first bracket 108 disposed about the bracket aperture 167 to overlap with the first portion 128 of the second bracket 112.

Figure 7:
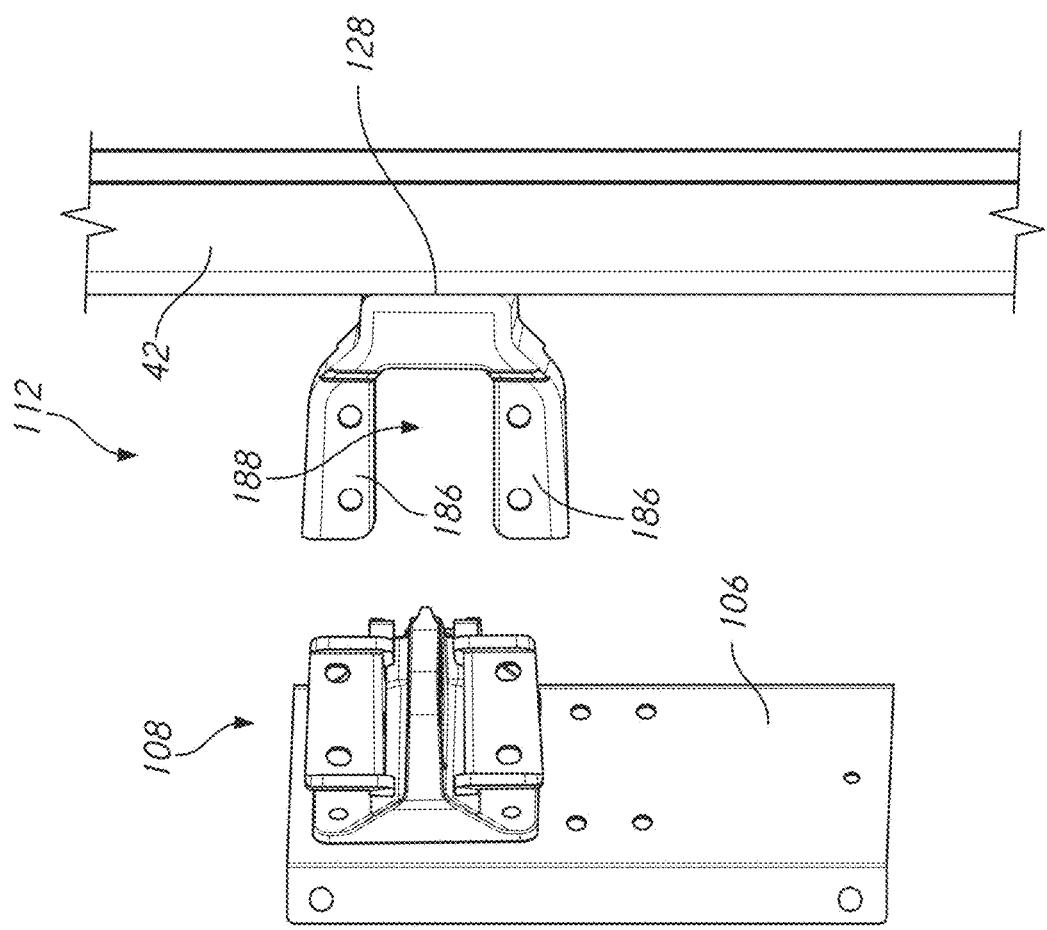
FIG. 7-8 are top and perspective views of a bracket assembly according to one embodiment.
Figure 8:
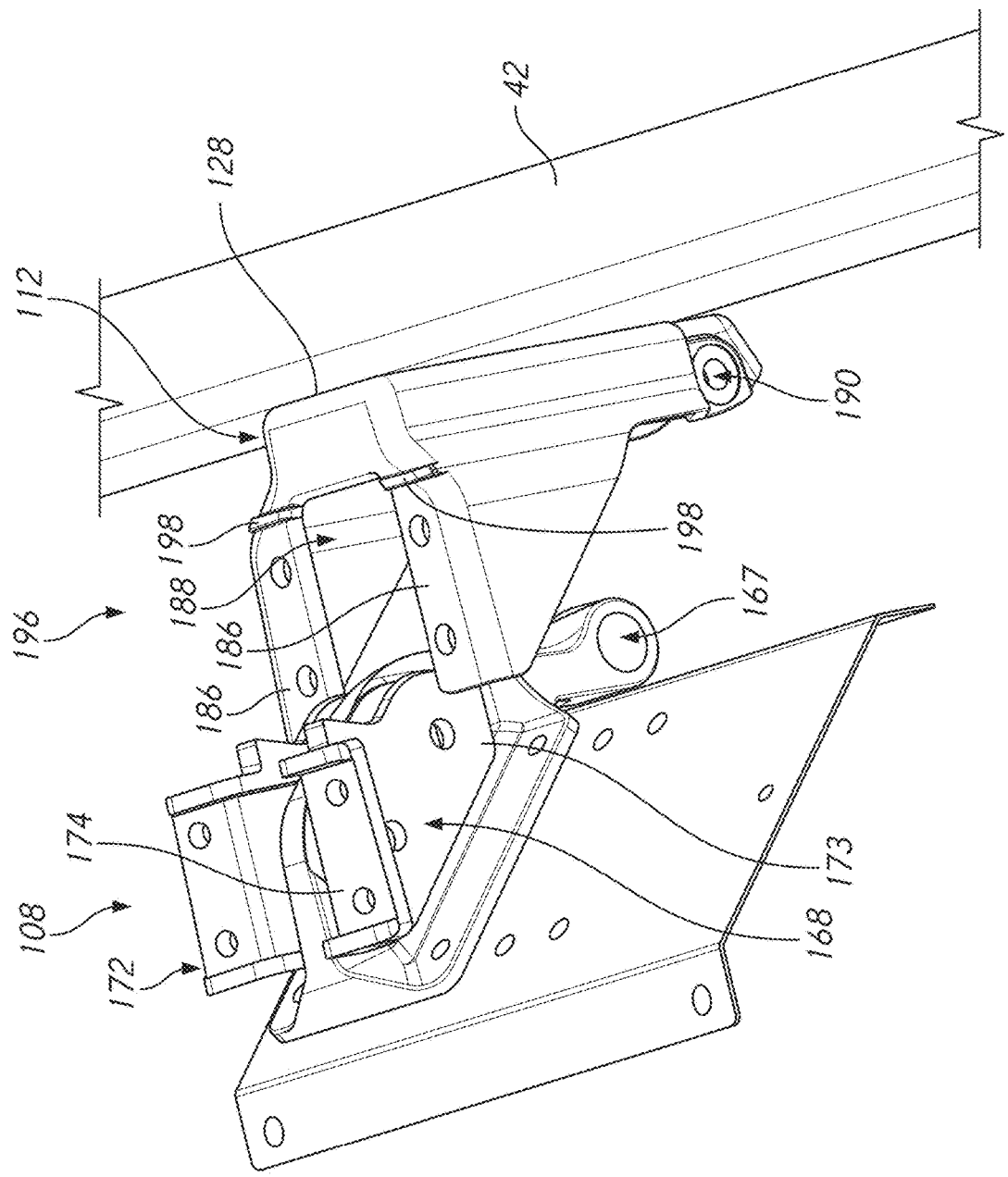

FIGS. 7-10 illustrate methods of assembling the fuel system 100 to the frame rail 42. FIG. 7 shows that the fuel system 100 with the first bracket 108 attached thereto at the frame rail connection portion 106 can be placed adjacent to the second bracket 112, which is coupled to the side 44 of the frame rail 42. The first bracket 108 and be placed at or slightly above the elevation of the second bracket 112. FIG. 8 shows that the first bracket 108 can be moved into the internal space 188. For example, the portion of the central flange 164 away from the vehicle side 100V can be moved into the internal space 188. The mount portion 173 of the first support wing 168 can be moved into the internal space 188. The first bracket 108 and the fuel system 100 coupled thereto can be moved down relative to the second bracket 112 from the position shown in FIG. 8 until a bottom side of the first support wing 168 (and of the wing 172) is disposed above, on top of or in contact with the vertical support 186. Specifically the vertical support 174 of the first support wing 168 of the first bracket 108 can be placed on top of the vertical support 186 of the second bracket 112. A vertical support of the wing 172 of the first bracket 108 can be placed on top of the vertical support 186 of the second bracket 112. FIG. 9 shows that when so placed, the rotational support 176 of the first bracket 108 can come into contact with a lower surface of the second bracket 112. The lower surface can be disposed on a transverse portion of the second bracket 112 disposed between the vertical support 186 and facing or partly bounding the internal space 188. The rotational support 176 can limit rotation of the fuel system 100 relative to the frame rail 42, which rotation can be a function of the outboard weight of the fuel system 100.

FIG. 10 shows that the transverse position of the fuel system 100 relative to the frame rail 42 can be at least partially controlled by the transverse motion limiter 196, e.g., by ridges 198 located on top of the vertical support 186. The ridges 198 can be configured, e.g., sized and positioned to abut an in-board face of the first bracket 108, e.g., of an inboard portion of one or both of the support wings 168, 172. Said another way, as the fuel system 100 and the first bracket 108 move toward the frame rail 42 the in-board side of one or both of the wings 168, 172 will abut the ridges 198 and such abutment can be detected by the assemble device or personnel positioning the fuel system 100. This will confirm that the first bracket 108 and the second bracket 112 are at least temporarily connected. This position will also bring the bracket aperture 167 in line with the bracket aperture 190, as discussed above.

These configurations allow the fuel system 100 to be at least temporarily secured to the frame rail 42 without any additional connecting devices, e.g., without any bolts passing through both of the brackets 108, 112. FIGS. 9 and 10 shows that subsequently, e.g., before sending the vehicle 40 out on the road at the end of assembly, bolts can be passed through both brackets 108, 112 to provide a more secure connection.

The manner of assembling the third bracket 140 to the fourth bracket 152 can be the same as that discussed above in connection with the first bracket 108 and second bracket 112. Additionally, the bracket assembly methods can include selecting a position from a discrete number of positions or along a continuous range, for connection of the first bracket 108 to the frame rail connection portion 106. The position selected can be based on the presence of other components on the frame rail 42, e.g., of a frame cross-member. The position of the first bracket 108 can follow a preferred location of the second bracket 112 to avoid interference with such components. The position of the first bracket 108 can follow a preferred location of the second bracket 112 to share a mount location with another member. The position of the second bracket 112 can follow a preferred location of the first bracket 108.

II. Neck Mounted Fuel Tank Assemblies for Side Mounted Fuel Systems

The fuel system 100 provides a number of advantages, some of which relate to the manner in which the fuel tank 102 thereof is supported within the cover 105. The fuel tank 102 is supported in novel ways, e.g. at ends thereof and with arcuate supports that provide advantages positioning relative to the frame rail 42. In some embodiments, the fuel system frame 104 is configured with low profile mounting configurations, to maintain mounting locations between ends of the cover 105 of the fuel system 100 to provide low profile mounting configurations. In some embodiments, the fuel system frame 104 has extended mounting location configurations to position the mounting locations outside the area opposite the fuel tank 102 to leave the frame rail 42 free from connections opposite the fuel tank 102.

A. Low Profile Mounting Configurations

Figure 11:
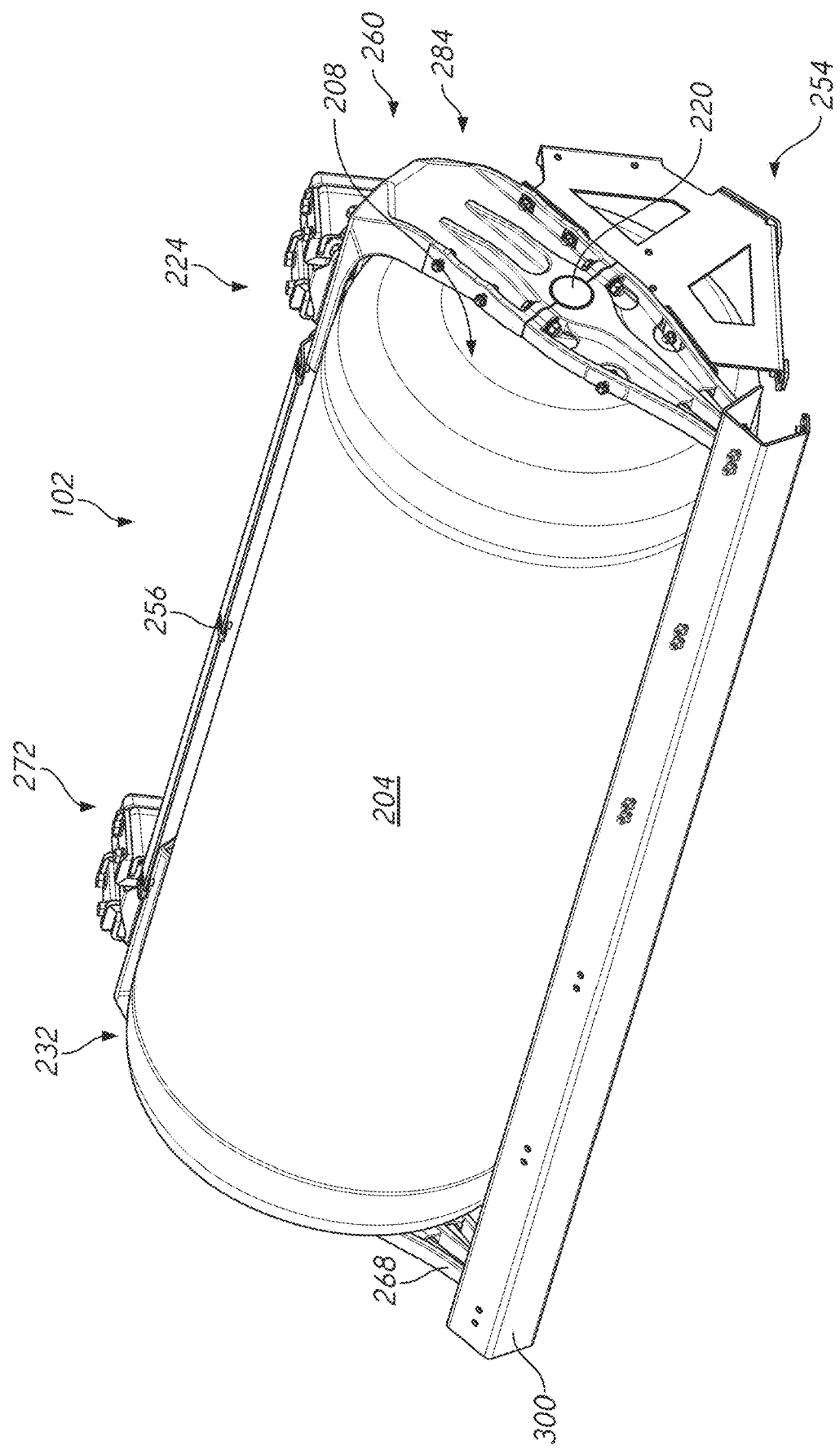
FIG. 11 is a perspective view of the fuel system of FIG. 2 with the cover thereof removed showing neck support of the fuel tank.

FIG. 11 shows the fuel system 100 with the cover 105 removed. The fuel tank 102 has a central cylindrical portion 204, a first neck portion 208, and a second neck portion 212. The first neck portion 208 includes a first boss 220 located at the end of the fuel tank 102. The first boss 220 is a sealed portion of the fuel tank 102 that can have fuel conduit coupled therewith to enable filling fuel into and drawing fuel from the fuel tank 102. The first boss 220 is also sufficiently rigid to enable the fuel tank 102 to be supported at that location as discussed further below. The fuel tank 102 can have a second boss 228 disposed at a second end 232 of the fuel tank 102. The fuel tank 102 also can include a polymeric liner at least in the central cylindrical portion 204 thereof. The liner can be secured to a first dome assembly including the first boss 220 and to a second dome assembly including the second boss 228.

In some embodiments the fuel tank 102 is supported only at the first neck portion 208 and the second neck portion 212. In such embodiments, no straps are provided in the central cylindrical portion 204 nor is the fuel tank 102 supported in any other manner between the first end 224 and the second end 232. In other embodiments, one or more supporting straps also can be provided between the first end 224 and the second end 232 to support the fuel tank 102.

Figure 12:
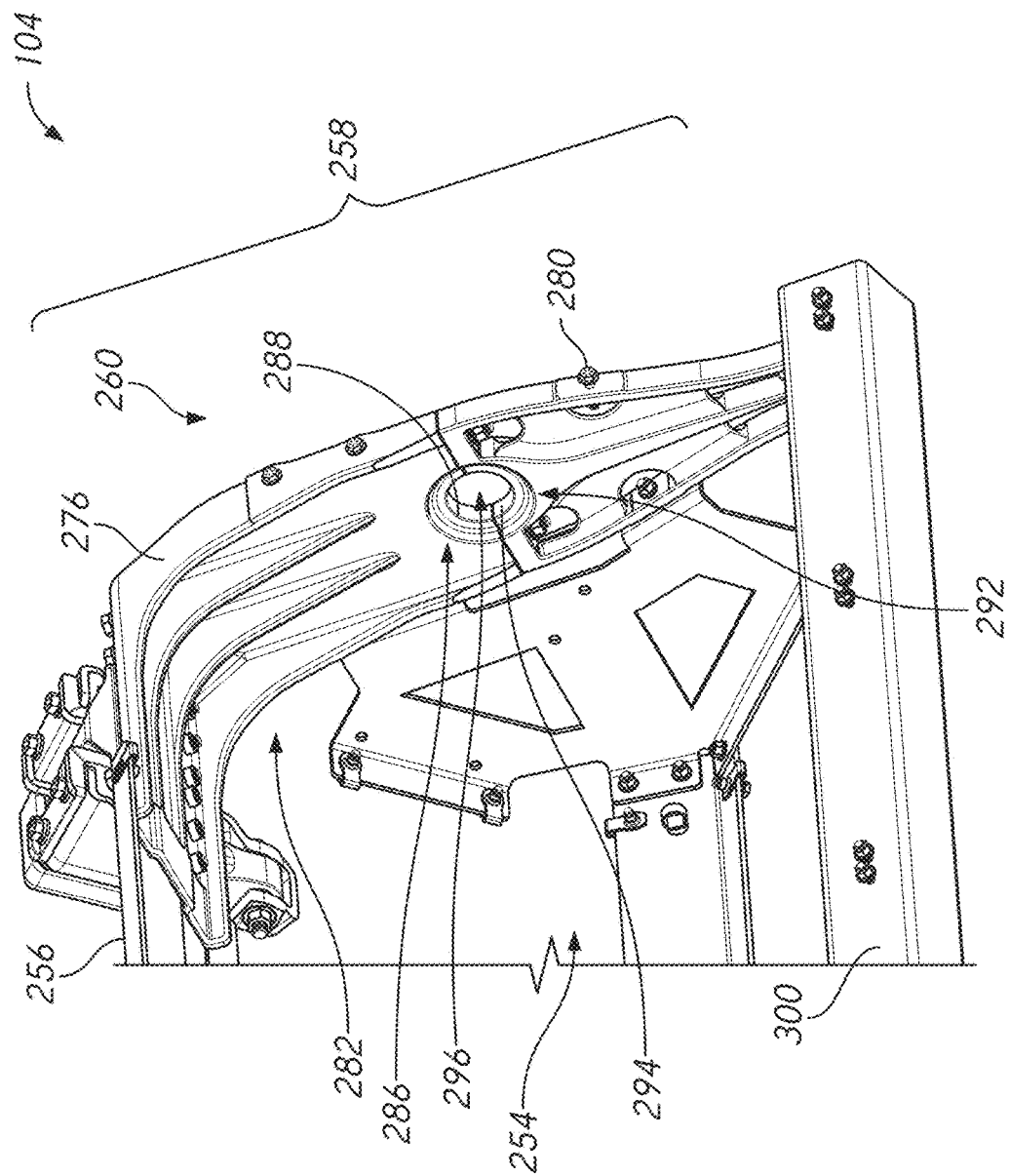
FIG. 12 is a perspective view of a frame assembly of the fuel system of FIG. 2 with the cover and the fuel tank removed.

FIGS. 11 and 12 show that the fuel system frame 104 that includes the frame rail connection portions 106 (forward and rearward) can also include tank end support portion 258 that are secured to the first end 224 and the second end 232 of the fuel tank 102. The tank support portions 258 extend across a diameter of and around forward and rearward ends of the fuel tank 102. The tank support portions 258 on forward and rearward ends are connected by a structural member 256 to provide a concave frame structure into which the fuel tank 102 is received. The fuel system frame 104 can further include a collision load member 300 on a lateral side to absorb at least some of the load of an impact. The fuel system frame 104 can also include a lower frame assembly 254 for supporting the cover 105 and/or for enhancing the strength of the fuel system frame 104. The lower frame assembly 254 can be disposed around and under a portion of the fuel tank 102 circumferentially between the positions of the tank support portions 258. FIG. 11 shows that the fuel system frame 104 including the tank support portions 258, the lower frame assembly 254 and the collision load member 300 can form an enclosure disposed about half of the circumference of the fuel tank 102 such that the fuel tank 102 can be placed within the frame from the other half circumference. In one assembly technique, the second tank support portion 268 is separated from the first tank support portion 260 of the tank support portion 258. The first tank support portion 260 and the second tank support portion 268 can be separated on both ends of the frame assembly. The first boss 220 and the second boss 228 can be placed into the concave ends of the first tank support portion 260. Thereafter, the second tank support portion 268 can be secured to the first tank support portion 260 to form the tank support portion 258 around the first boss 220 and the second boss 228. Fasteners, such as bolts can then be advanced through apertures in the first tank support portion 260 and the second tank support portion 268 provide a rigid connection in the tank support portion 258. In some embodiments, the lower frame assembly 254 is assembled to the tank support portion 258 on each end of the frame assembly after the second tank support portion 268 is secured to the first tank support portion 260.

FIG. 12 shows more detail of the structure of the tank support portion 258. The tank support portion 258 includes a first tank support portion 260 and a second tank support portion 268. The first tank support portion 260 can be disposed on a rearward side of the fuel system 100. The second tank support portion 268 can be located on the forward side of the fuel system 100. The first and second tank support portions 260, 268 can be similar, e.g., mirror images of each other. The first tank support portion 260 will be discussed in detail. The description of the first tank support portion 260 and the second tank support portion 268 can be applied to each other.

The first tank support portion 260 can include a first tank bracket 276 and a second tank bracket 280. The first tank bracket 276 can include a first ribbed side 282 and a second ribbed side 284. The first ribbed side 282 can have a plurality of, e.g., two, three, or four, or more than four ribs to enhance the strength of the first tank bracket 276. The ribs can enhance the stiffness of the brackets.

The second tank bracket 280 can include a first block 286 disposed at an end thereof configured to engage the fuel tank 102. The first block 286 includes a first support surface 288 configured to engage the fuel tank 102. The second tank bracket 280 also can include a second block 292. The second block 292 includes a second support surface 294 configured to engage the fuel tank 102. One or both of the first block 286 and the second block 292 can include a thicker portion of the first tank bracket 276 and the second tank bracket 280, as shown in FIG. 11. The blocks 286, 292 can have a thickness sufficient to secure fasteners therein and therebetween. A space 296 defined between the first support surface 288 and the second support surface 294 can be configured to receive the first boss 220 of the fuel tank 102. The first tank bracket 276 and the second tank bracket 280 can be separate components to be joined as appropriate, e.g., by one or more bolts through the first block 286 and the second block 292.

FIGS. 11 and 12 show that the fuel system frame 104 can be configured to locate the mounting points or locations inward of the ends of the fuel system 100. As discussed above, the first bracket 108 and the third bracket 140 are secured to the frame rail connection portions 106 away from the first end 224 and the second end 232 of the fuel tank 102. For example, the first tank bracket 276 can be formed such that a first portion thereof extends to the first block 286 and a second end is coupled with or extends to the frame rail connection portion 106. The first tank bracket 276 can comprise an L-shaped or curved construction with the first block 286 on one end and the frame rail connection portion 106 on an end opposite the first block 286. The L-shape or curve can have an inner angle or portion that includes the first ribbed side 282. The L-shape or curve can have an inner portion that follows the curvature of the fuel tank 102. The inner angle or portion can be oriented toward the mounting space for the tank.

FIGS. 11 and 12 show that this configuration allows the frame rail connection portion 106 to be located within the fuel system frame 104 at a longitudinal position of the fuel system 100 that is toward the central cylindrical portion 204 of the fuel tank 102, e.g., at or over the cylindrical portion 204. For example the second bracket 112 and/or the fourth bracket 152 can be aligned with, e.g., intersected by or centered on a plane containing the ends of the central cylindrical portion 204 (e.g., the liner portion) of the fuel tank 102. In other words, a projection of the first end 224 and/or the second end 232 of the fuel tank 102 into the plane of the second portion 132 of the second bracket 112 would show the second bracket 112 to be between the projected ends. FIG. 2 shows that the second bracket 112 and the third bracket 140 can thus be spaced from the ends of the fuel system 100 with the cover 105 in place.

The curved configuration of the first tank bracket 276 can allow the cover 105 to be shaped to create space for components on the frame rail 42. As shown in FIG. 2 the shape of the first tank bracket 276 on the forward side of the fuel system 100 can enable the cover 105 to have an angled surface 103 creating space for the shackle 50 (or other low profile component mounted to the frame rail 42). By moving the mount points on the frame rail connection portion 106 away from the forward and/or the rearward ends of the fuel system 100, a more compact mounting arrangement or footprint for the fuel system 100 can be provided on the frame rail 42. Also, the mount point locations on the frame rail connection portion 106 provide more options for supporting the fuel system 100 and other components on the frame rail 42. For instance, the shackle 50 can be mounted to the frame rail 42 opposite the angled surface 103, e.g., rearward of the projection 49 (see FIG. 2).

B. Extended Mounting Location Configurations

Figure 11A:
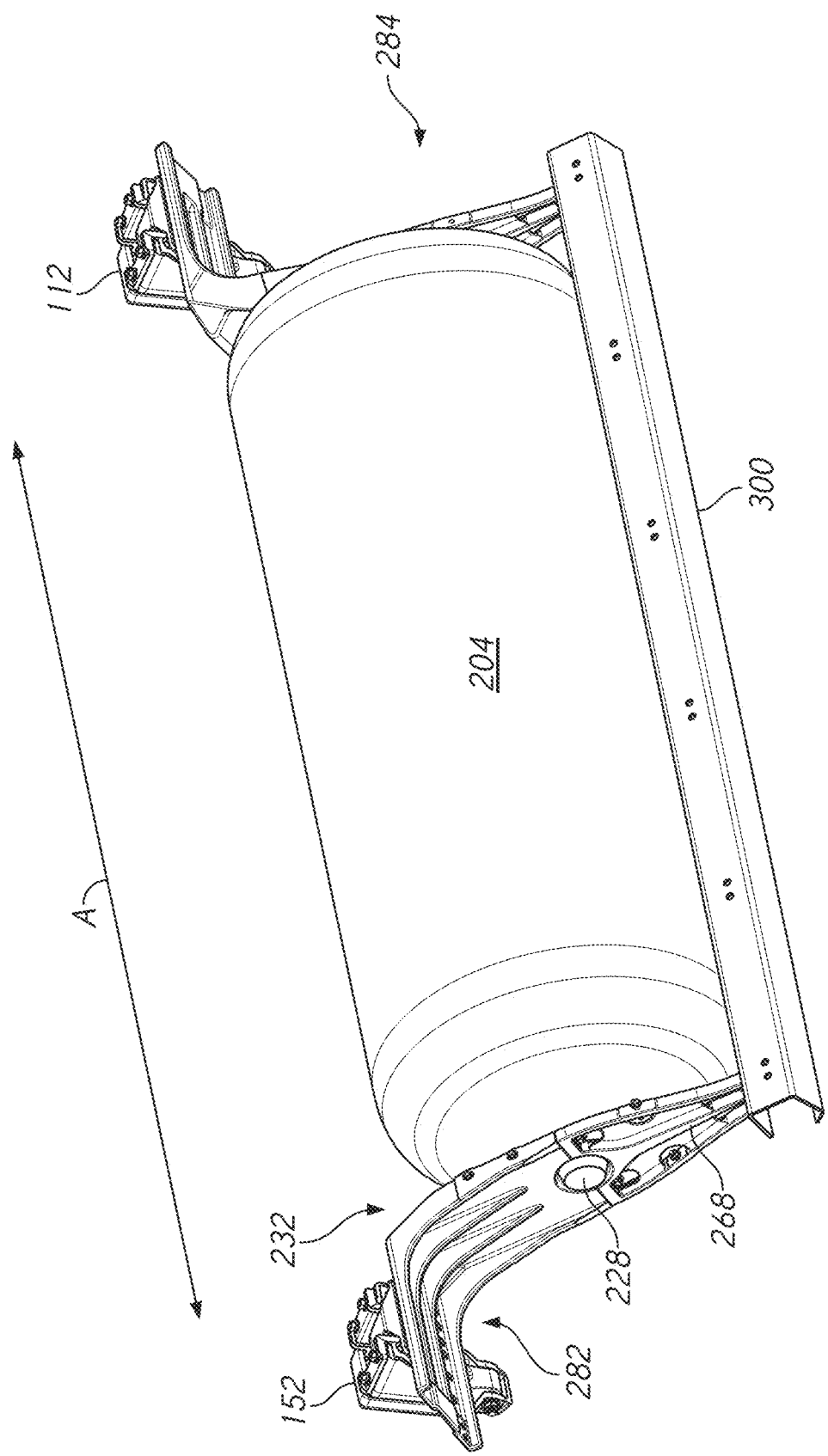
FIGS. 11A-11B show a perspective view of an alternative configuration in which fuel system mounting positions are located outside of a projection of the fuel tank, e.g., of a forward end of the fuel tank and/or rearward of a rearward end of the fuel tank.
Figure 11B:
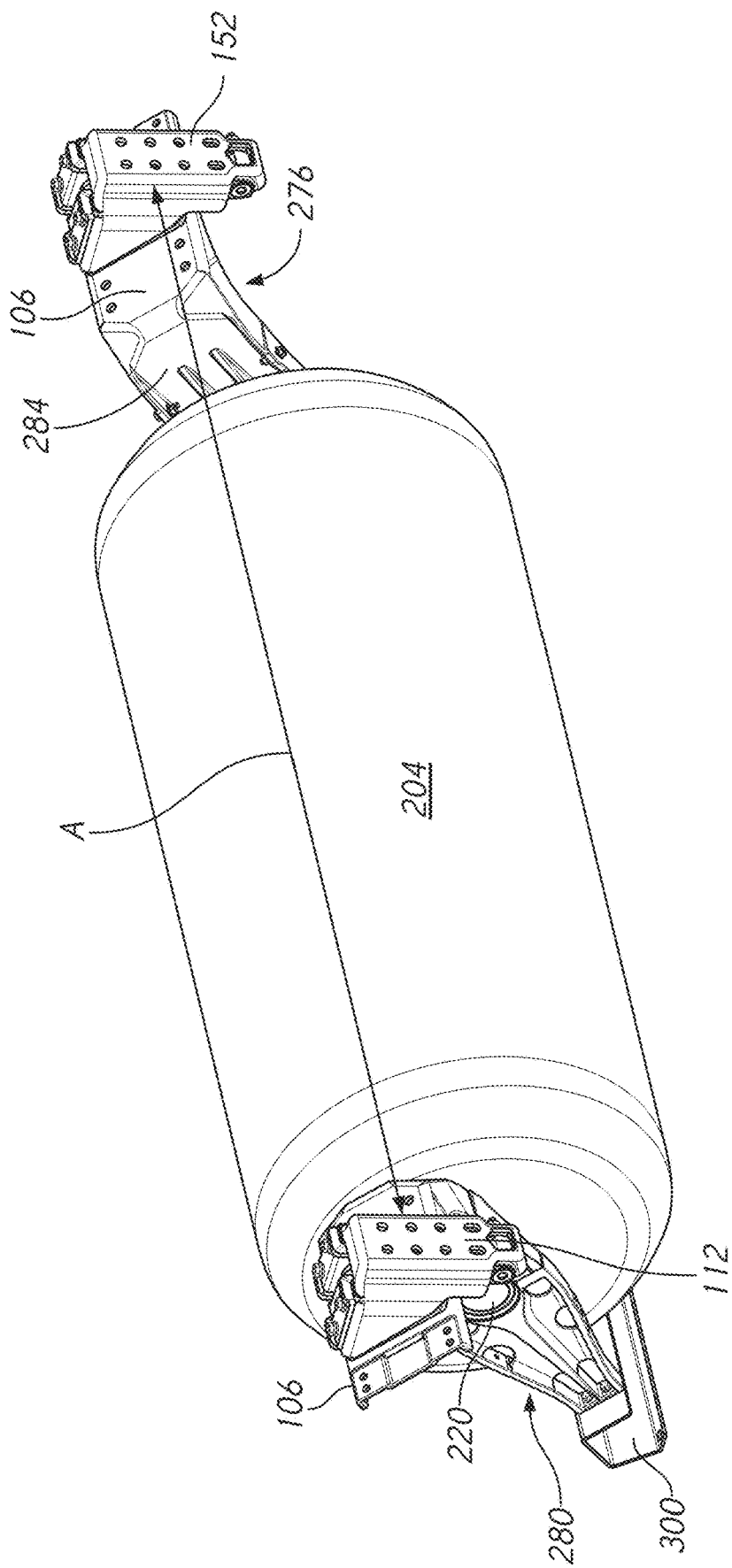

While reducing the longitudinal extent of the footprint of the fuel system 100 between the second bracket 112 and the fourth bracket 152 can be beneficial, in some embodiments it is desirable to avoid locating mounting points between the ends of the fuel tank 102 or even between the forward and rearward faces of the cover 105. FIGS. 11A and 11B show that the fuel system frame 104 can have another frame mounting configuration in which the first tank bracket 276 on the forward and/or the rearward ends of the fuel system 100 are re-oriented so that the first ribbed side 282 faces away from the space in which the fuel tank 102 is mounted.

The first block 286 can be configured to mount to the second tank bracket 280 in at least two different orientations, e.g., as shown in FIG. 12 for a low profile frame rail mounting configuration or as in FIGS. 11A and 11B for a frame rail configuration avoiding a length A of the frame rail 42 opposite the fuel tank 102. Fastening apertures on the first block 286 of the first tank bracket 276 and on the second block 292 of the second tank bracket 280 can align in a configuration where the internal angle of the first tank bracket 276 faces toward the fuel tank 102 or where the internal angle of the first tank bracket 276 faces away from the fuel tank 102. In a configuration for reversing the first tank bracket 276, mount features for supporting the lower frame assembly 254 can be provided on both of the short sides that extend between the first ribbed side 282 and the second ribbed side 284. The cover 105 can be modified to enclose the reversed first tank bracket 276 on one or both of the forward and rearward sides of the fuel system 100. End portions of an overall enclosure of the fuel system 100 that includes the cover 105 can be modified to have an opening through which the first tank bracket 276 can extend to position the frame rail connection portion 106 at an exposed location for mounting to the frame rail 42. For example, the cover 105 can be disposed circumferentially around the fuel tank 102. Sheet or plate members can be coupled with the ends of the circumferential cover 105. The sheet or plate members can cover then ends, e.g., the end shown in FIG. 13 to form an overall enclosure. When so extended the forward frame rail connection portion 106 is located forward of the second end 232 of the fuel tank 102 and the rearward frame rail connection portion 106 is located rearward of the first end 224 of the fuel tank 102.

The configuration of the fuel system frame 104 illustrated in FIGS. 11A and 11B provides an arrangement whereby a length of the frame rail 42 between the ends of the fuel system 100 and even between the first end 224 and the second end 232 of the fuel tank 102 is free of connection locations for the fuel system 100. The fuel system 100 is disposed at or over this portion of the frame rail 42. The frame rail 42 at the connection free length can be used for mounting other components between the fuel system 100 and the rail or on an in-board side of the frame rail 42 (opposite the side 44). For example, internal trusses of the chassis of which the frame rail 42 is a part can be located along this length without concern for interference between such trusses and the brackets coupled to the forward and rearward frame rail connection portions 106.

III. Access Step Support Configurations

Figure 13:
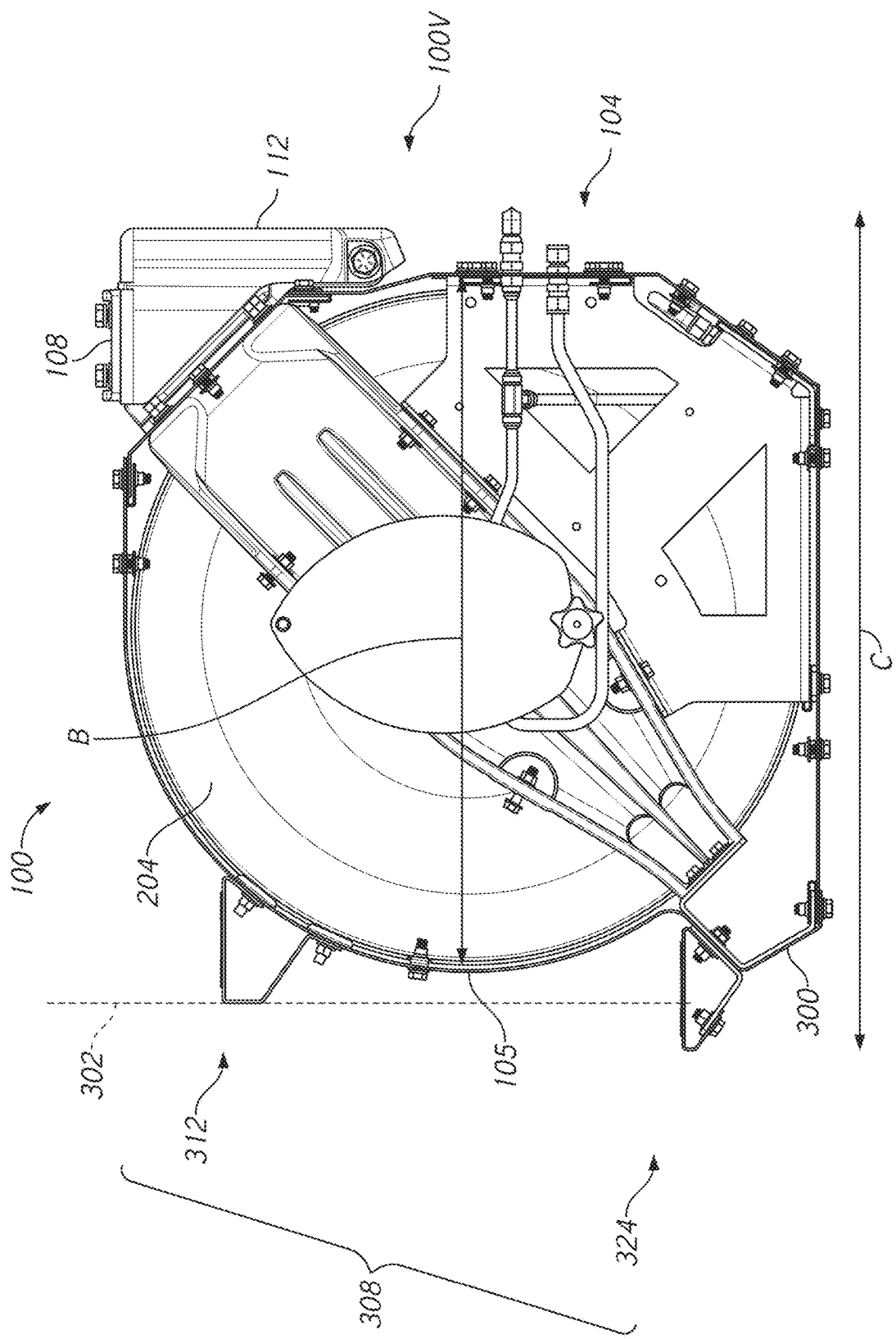
FIG. 13 is an end view of the fuel system of FIG. 2 with an end portion of the cover of the system removed, showing a step assembly of the fuel system.

In some cases it is desired to include a larger fuel tank 102, e.g., a tank of more than 24 inches in diameter, e.g., 25 inches, 26 inches, or 27 inches in diameter. This desire for larger size of the fuel tank 102 conflicts with a limitation on the lateral extent of the fuel system 100 when applied to the vehicle 40. With reference to FIG. 13, it is desired to maximize dimension B (tank diameter) while not increasing dimension C (distance from frame rail mount location to outward most extent of the fuel system 100). Another constraint is that if more than one step is provided, an upper step should be in-board of an upper step boundary 302. The upper step boundary 302 provide enough clearance for a user to comfortably lift his or her foot from a lower step 324 to a step member 312 of a step support assembly 308. In some embodiments, the fuel system 100 includes enhanced access step configurations that enable the fuel system 100 to be meet these conflicting requirements.

FIGS. 2 and 13 shows that a step support assembly 308 can have an external portion disposed outside the cover 105 to be accessible to the user for accessing the cab of the vehicle 40. The external portion of the step support assembly 308 can include a step member 312 that is formed to provide a low profile on a lateral side of the fuel system 100 and in some embodiments a second (e.g., a lower) step portion 324. The step member 312 can be supported directly on an outside surface 320 the fuel tank 102 by a compressible member 316, discussed further below. The direct support on the outside surface 320 of the fuel tank 102 helps to maintain a compact configuration in the width direction, e.g., to maintain as small a dimension C as possible (see FIG. 13).

Figure 13A:
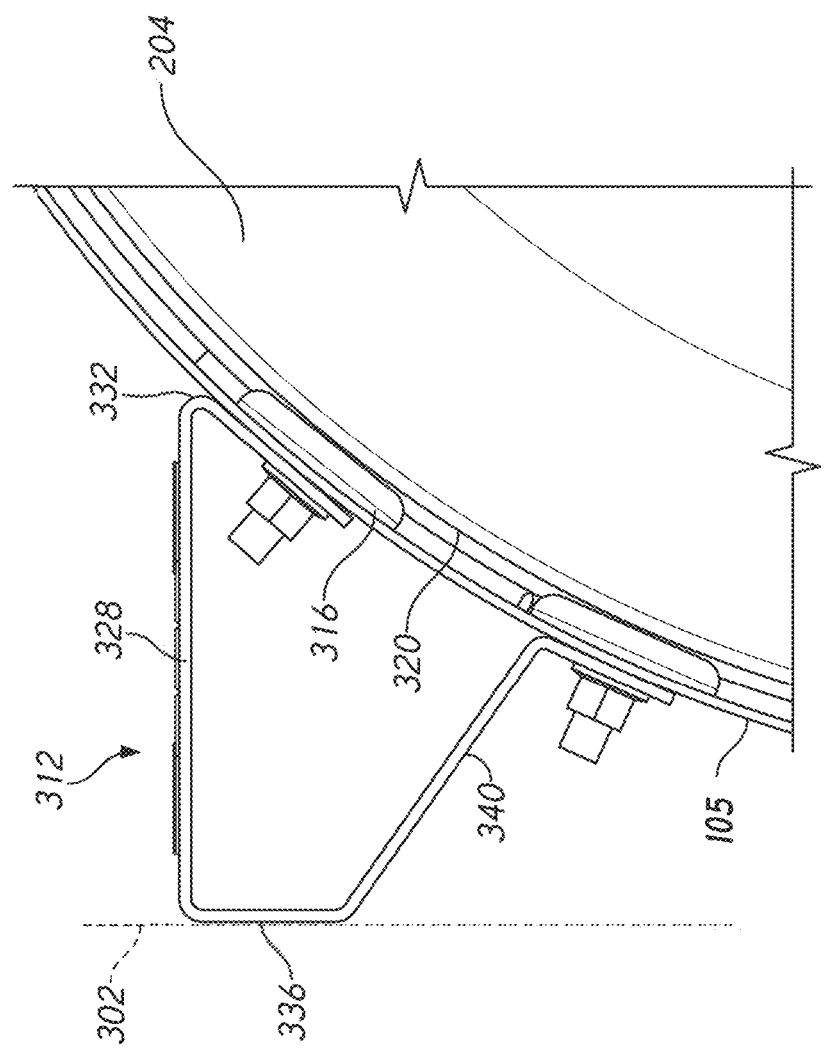
FIG. 13A is a detail view of a step assembly of FIG. 13 of the fuel system of FIG. 2.

Unlike many conventional steps, in some embodiments the step member 312 is not rectangular in cross-section. FIG. 13A shows one profile of the step member 312 in which an upper surface 328 that is exposed and onto which the user can step. The upper surface 328 of the step member 312 can be generally horizontal to provide a flat surface for stepping. A first lateral edge 332 of the step member 312 can be disposed adjacent to the outside surface 320 of the fuel tank 102. In one embodiment, the step member 312 can be formed from a sheet. An edge of the sheet can be folded to form the first lateral edge 332. In particular, the edge of the sheet can be folded at least partially under the upper surface 328. The folded under portion can be formed to generally follow the curvature of the tank. In one example, the folded under portion can have an internal angle of less than 90 degrees or an external angle of greater than 270 degrees. The folded over portion can provide a length over which apertures for coupling to the compressible member 316 can be provided, as discussed further below. The step member 312 can have a second lateral edge 336 disposed opposite the first lateral edge 332. The second lateral edge 336 can comprise the lateral most extent of the step member 312. The second lateral edge 336 can be located inward of the upper step boundary 302.

The step member 312 can include a lower surface 340 that extends from a lower portion of the second lateral edge 336 toward the tank when assembled to the tank, as shown in FIG. 13A. The lower surface 340 can be disposed at an angle to the second lateral edge 336, e.g., at an internal angle that is greater than 90 degrees, or at an external angle that is greater than 180 degrees. As shown in FIG. 13A, the lower surface 340 preferably extends at a non-horizontal angle toward the outside surface 320 of the fuel tank 102. The internal angle between the lower surface 340 and the second lateral edge 336 is preferably about 120 degrees.

As discussed above, the step member 312 can be formed from a sheet. In one embodiment, an edge of the sheet can be folded over to define the lower extent of the lower surface 340. The folded over portion can include one or a plurality of apertures to facilitate securing the compressible member 316 and a portion of the cover 105 between the step member 312 and the fuel tank 102. In one embodiment a folded over portion of the step member 312 extends away from the lower surface 340. The folded over portion can extend generally in a direction along the fuel tank 102. The folded over portion can be curved to follow the curvature of the fuel tank 102 or can be generally straight but disposed along a direction generally tangential to the outside surface 320 of the fuel tank 102. The folded over portion can extend at an internal angle to the lower surface 340 of about 90 degrees. Other angles are possible. In some embodiment, the folded over ends of the step member 312 are sufficiently flexible to allow the ends to conform to the tank shape when the step member 312 is attached to the fuel system 100.

The non-rectangular shape of the step member 312 as formed and when applied to the outside surface 320 of the fuel tank 102 enable the fuel system 100 to maximize the length of the upper surface 328 while remaining in-board of the upper step boundary 302. FIGS. 13 and 13A illustrate one example of a non-rectangular step configuration that help maximize the size of the tank (dimension B—see FIG. 13) while not overly extending the width dimension of the fuel system 100 (dimension C—see FIG. 13).

The step support assembly 308 also enhances compactness and step size by providing a more direct connection between the step member 312 and the fuel tank 102. In one embodiment, folded over end portions of the step member 312 are mounted to the outside surface 320 through intervening compressible members 316. The compressible member 316 are placed on an upper half of the fuel tank 102 such that a stepping force is opposed by the outside surface 320 of the fuel tank 102. In particular, the load will be applied through the compressible members to the outside surface 320. In one embodiment, the step member 312 is supported by one or a plurality of compressible member 316, e.g., by two, four, six or eight compressible member 316. The compressible member 316 can be formed of a polymeric material, such as one or more of a neoprene, a rubber material, nitrile rubber, natural rubber, and EPDM. The compressible member 316 can be generally circular in shape and can have a diameter of about one-half inch to two inches. In other specific examples, the compressible member 316 has a diameter of about one inch, about two inches, about three inches, or about four inches. FIG. 13 shows that the cover 105 can be disposed between the step member 312 and an outside surface of the compressible member 316.

The lower step 324 can be coupled with the collision load member 300. In one embodiment, the cover 105 is disposed between the lower step 324 and the collision load member 300. The lower step 324 can be intersected by the upper step boundary 302 such that a lower foot can rest on the lower step 324 and an upper foot of a user can be lifted up and over the second lateral edge 336 of the step support assembly 308 and come comfortably to rest across the upper step boundary 302 and onto the upper surface 328 of the step member 312.

In some embodiments the first bracket 108 can have a number of connection points to more permanently connect the first bracket 108 to the second bracket 112. For example, a plurality of, e.g., two, apertures can be formed through upper segments of the first support wing 168 and the second support wing 172 to secure the first bracket 108 to the second bracket 112.

IV. Access Door Configurations

In some cases it is desired to include an access door 400 on one or more ends of the fuel system 100. The access door 400 can be configured to move between a closed position and one or more open positions. Moving the access door 400 to an open position can uncover an opening 420 on an end of the fuel system 100 and provide access to certain components within the fuel system 100. In some cases, the opening 420 is vertically elongated to provided access along a majority, e.g., along 75 percent, of the height of the side of the cover 105. The access door 400 can have a shape matching that of the opening 420.

Figure 14:
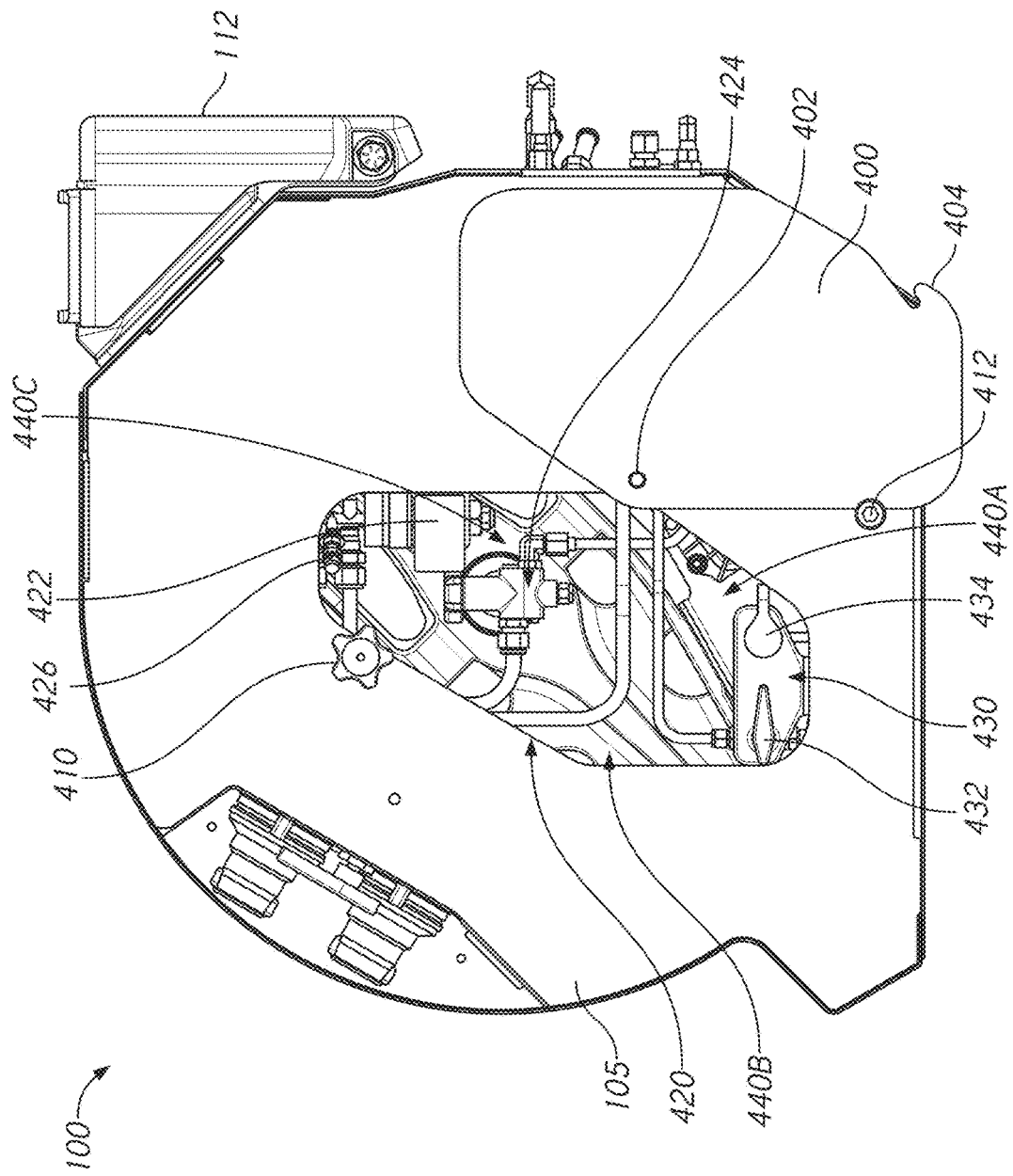
FIG. 14 is an end view of the fuel system of FIG. 2 showing an access door in an open position.
Figure 14A:
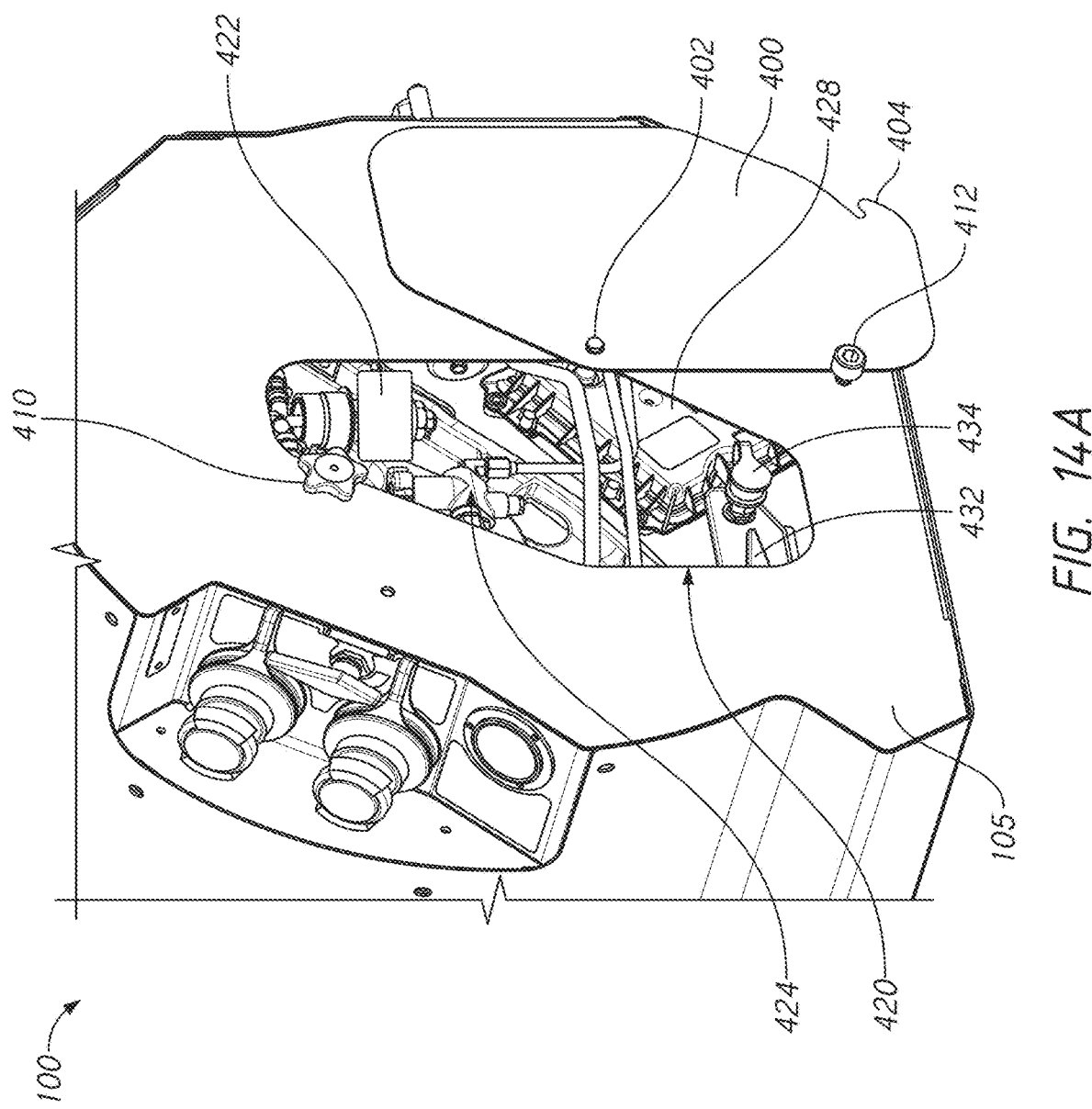
FIG. 14A is a perspective view of an end of the fuel system of FIG. 2 showing the access door of FIG. 14 in an open position.
Figure 14B:
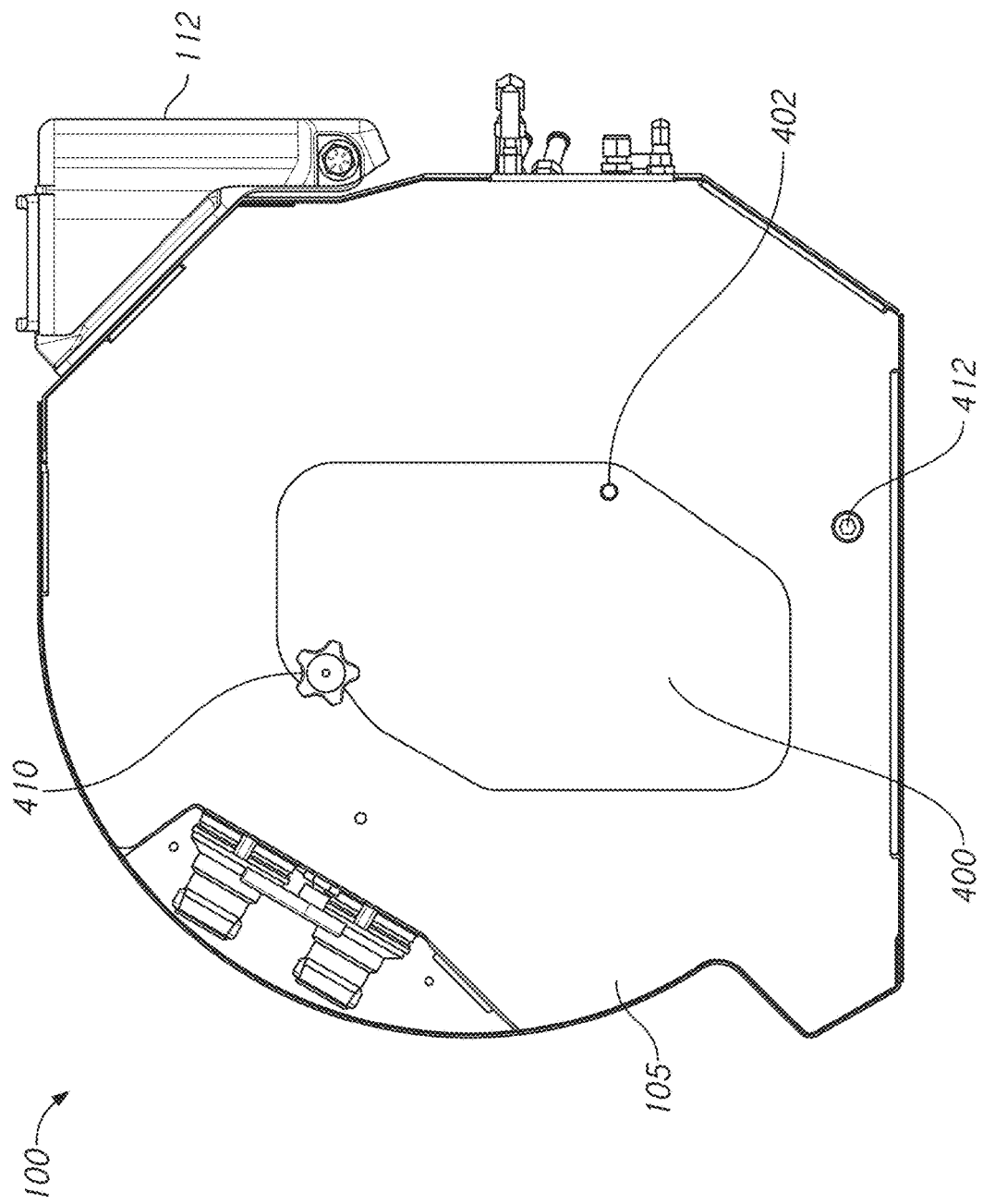
FIG. 14B is an end view of the fuel system of FIG. 2 showing the access door of FIG. 14 in a closed position.

In some embodiments, the access door 400 can be coupled to the cover 105 of the fuel system 100. For example, as shown in FIGS. 14, 14A, and 14B, the access door 400 can be rotatably coupled to an end portion of the cover 105 by a pivot 402. In some embodiments, the pivot 402 is configured to provide some amount of resistance to rotation of the access door 400 (e.g., friction), thereby preventing the access door 400 from freely rotating about the pivot 402 under its own weight and allowing the access door 400 to remain fixed in any position. The resistance provided by the pivot 402 can be easily overcome by applying additional force to the access door 400, such as by manually moving the access door 400 about the pivot 402.

In some embodiments, the axis of rotation of the access door 400 extends through the pivot 402, perpendicular to the outer surface of the end portion of the cover 105, allowing the access door 400 to be rotated between open and closed positions (e.g., rotated clockwise and/or counterclockwise) while keeping an inner surface of the access door 400 parallel to the outer surface of the end portion of the cover 105. This configuration can advantageously allow the access door 400 to be opened and closed even when space is limited between components of the fuel system 100 (e.g., when an outwardly swinging door would not be usable). For example, in some embodiments, the access door 400 can be opened and closed when the fuel system 100 is side-mounted and there is 4 inches or less clearance between the fuel system 100 and another component mounted to the frame rail 42 adjacent to the system 100. The access door 400 can be shaped such that the access door 400 does not interfere with portions of the fuel system frame 104 and brackets.

In some embodiments, the access door 400 can be secured in a closed position using a fastener 410. In some embodiments, the fastener 410 can comprise a bolt, rod, knob, lever, and/or button. For example, in some embodiments, the fastener 410 comprises a knob threaded on a rod. In some embodiments, the fastener 410 is fixed in a particular location on the fuel system 100 (e.g., does not change position when the access door 400 changes position). For example, the fastener 410 can be coupled to the outer surface of the cover 105.

In some embodiments, a portion of the access door 400, such as a flange 404, can be configured to be positioned between a lower surface of the fastener 410 and the outer surface of the cover 105 when the access door 400 is in the closed position. In some embodiments, the fastener 410 is configured to be tightened against a portion of the access door 400 to prevent rotation of the access door 400 about the pivot 402. The flange 404 can comprise a hook portion that can be disposed around a shaft of the fastener 410 to at least temporarily fix the closed position of the access door 400. For example, the fastener 410 can be configured to be rotated or otherwise adjusted to secure (e.g., compress) a portion of the access door 400, such as the flange 404, tightly against the outer surface of the cover 105, thereby securing the access door 400 in position relative to the rest of the fuel system 100. In some embodiments, rotation of the fastener 410 in a first direction (e.g., clockwise) tightens the fastener 410 against a portion of the access door 400 and rotation of the fastener 410 in a second direction (e.g., counterclockwise), opposite the first direction, releases the access door 400 from its closed position, allowing the access door 400 to be rotated about the pivot 402.

In some embodiments, it is desired to include a holder 412 configured to hold the access door 400 in one or more positions, such as in an open position. For example, as shown in FIG. 14, the holder 412 can be coupled to the cover 105 and configured to prevent the access door 400 from rotating beyond a particular location when the access door 400 is in an open position (e.g., by abutting an edge of the access door 400). This can prevent the access door 400 from blocking or covering a portion of the opening 420 when the access door 400 is in an open position. The holder 412 can be a protrusion, rod, screw, and/or clamp.

In some embodiments, the access door 400 can provide access, through the opening 420, to three or more components within the fuel system 100. This configuration can make it easier, faster, and/or more cost-efficient to service components of the fuel system 100. For example, in some embodiments, as illustrated in FIGS. 14 and 14A, the access door 400 can provide access to a filter 422, a cylinder valve assembly 424, a bleed valve 426, a defuel assembly 430 comprising a defuel valve 432 and a defuel nozzle 434, an electronic control unit (ECU) 428, and/or fuel assembly plumbing.

In some embodiments, the access door 400 can provide access, through the opening 420, to components of the fuel system 100 that are mounted on more than one modular plate. The opening 420 can provide access to components of more than one subassembly. For example, the access door 400 can provide access to components of the fuel system 100 that are mounted on a first plate 440A, a second plate 440B, and/or a third plate 440C. In some embodiments, the defuel assembly 430 and the filter 422 are mounted on different plates 440A, 440C. In some embodiments, the defuel assembly 430 and the ECU 428 are mounted on the same plate 440A. In some embodiments, the filter 422 and the cylinder valve assembly 424 are mounted on the same plate 440C.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A fuel system, comprising:
a fuel system frame for supporting a fuel tank that comprises a forward end having a forward-extending boss, a rearward end having a rearward-extending boss, and a central portion extending along a longitudinal direction between the forward end and the rearward end, wherein each of the forward-extending boss and the rearward-extending boss is positioned laterally inward of an outer surface of the central portion,
the fuel system frame comprising a frame rail connection portion and a tank end support portion, the frame rail connection portion extending along the longitudinal direction from a first end to a second end, the tank end support portion extending laterally from the second end of the frame rail connection portion and comprising a support surface configured to support one of the rearward-extending boss or the forward-extending boss,
the frame rail connection portion comprising a first mounting position and a second mounting position, the second mounting position spaced apart from the first mounting position along the longitudinal direction;
a first bracket configured to connect to the frame rail connection portion of the fuel system frame at the first mounting position or at the second mounting position to support the fuel system frame from either the first mounting position or the second mounting position; and
a second bracket having a first portion configured to mate with the first bracket and a second portion configured to connect to a vehicle frame rail.

2. The fuel system of claim 1, wherein the support surface of the tank end support portion is configured to support the rearward-extending boss,
wherein the fuel system frame further comprises a second frame rail connection portion and a second tank end support portion, the second frame rail connection portion extending along the longitudinal direction from a first end to a second end, the second tank end support portion extending laterally from the second end of the second frame rail connection portion and comprising a support surface positioned laterally inward of the frame rail connection portion and configured to support the forward-extending boss,
wherein the first bracket and the second bracket are configured to support a rearward portion of the fuel system frame, and
wherein the fuel system further comprises a third bracket and a fourth bracket configured to support a forward portion of the fuel system frame.

3. The fuel system of claim 2, wherein the third bracket is configured to connect to the second frame rail connection portion of the fuel system frame at one of a plurality of mounting positions spaced apart along the longitudinal direction to support the fuel system frame from one of the plurality of mounting positions.

4. The fuel system of claim 1, wherein a resilient member is disposed between the fuel system frame and the second portion of the second bracket.

5. The fuel system of claim 4, wherein the resilient member is disposed within the first bracket.

6. The fuel system of claim 1, wherein the first bracket comprises a central flange and first and second support wings extending forwardly and rearwardly of the central flange.

7. The fuel system of claim 6, wherein a resilient member is disposed between the central flange and one of the first or second support wings.

8. The fuel system of claim 7, wherein the resilient member comprises a first resilient member and the fuel system further comprises a second resilient member disposed between the central flange and the other of the first or second support wings.

9. The fuel system of claim 8, further comprising a third resilient member disposed at a bracket connection portion spaced away from the first and second support wings.

10. The fuel system of claim 6, wherein a vertical support projects laterally from at least one of the first and second support wings to support the second bracket from below.

11. The fuel system of claim 6, wherein a transverse motion limiter projects vertically from at least one of the first and second support wings to constrain transverse relative movement between the first bracket and the second bracket.

12. The fuel system of claim 11, wherein the transverse motion limiter comprises ridges having a height of at least 25 percent of the vertical thickness of the first portion of the second bracket.

13. The fuel system of claim 1, wherein the first mounting position and the second mounting position are disposed along a continuous slot formed in the frame rail connection portion of the fuel system frame.

14. The fuel system of claim 1, wherein the first mounting position is at least partially defined by a first plurality of apertures in the frame rail connection portion, wherein the second mounting position is at least partially defined by a second plurality of apertures in the frame rail connection portion, wherein the first plurality of apertures comprises at least one aperture that is not part of the second plurality of apertures, and wherein the second plurality of apertures comprises at least one aperture that is not part of the first plurality of apertures.

15. The fuel system of claim 2, further comprising the fuel tank, wherein the rearward-extending boss is supported by the support surface of the tank end support portion, and the forward-extending boss is supported by the support surface of the second tank end support portion,
wherein the fuel tank is supported only at the forward-extending boss and the rearward extending boss, and
wherein the first, second, third, and fourth brackets are each positioned longitudinally between the forward-extending boss and the rearward-extending boss.

16. The fuel system of claim 2, wherein the frame rail connection portion and the second frame rail connection portion are connected together by a structural member such that the frame rail connection portion, the tank end support portion, the structural member, the second frame rail connection portion, and the second tank end support portion provide a concave frame structure into which the fuel tank can be received with the structural member positioned laterally inward of the central portion of the fuel tank.

17. The fuel system of claim 16, further comprising an outboard member connected to lateral outboard ends of both of the tank end support portion and the second tank end support portion, the outboard member configured to be positioned laterally outward of the central portion of the fuel tank.

18. The fuel system of claim 17, wherein the outboard member comprises a collision load member configured to absorb at least some of a load of an impact.

19. The fuel system of claim 17, wherein at least one of the tank end support portion or the second tank end support portion comprises a multi-part structure that is separable at a portion of the support configured to support the rearward-extending or forward-extending boss.

20. A fuel system, comprising:
a fuel tank comprising a central cylindrical portion extending along a longitudinal direction, a first neck portion comprising a first boss at a first end and a second neck portion comprising a second boss at a second end;
a support assembly configured to connect the fuel system to a side portion of a frame rail of a vehicle, the support assembly comprising;
a first tank end support portion configured to support the first neck portion of the tank;
a second tank end support portion configured to support the second neck portion of the tank;
a first frame rail connection portion extending inwardly from the first tank end support portion along the longitudinal direction;
a second frame rail connection portion extending inwardly from the second tank end support portion along the longitudinal direction; and
a bracket system comprising a first bracket assembly coupled with the first frame rail connection portion and a second bracket assembly coupled with the second frame rail connection portion;
wherein the bracket system is configured to be coupled to a frame rail in a configuration that positions a central portion, with respect to the longitudinal direction, of each of the first bracket assembly and the second bracket assembly at a frame rail position between, with respect to the longitudinal direction, the first neck portion of the fuel tank and the second neck portion of the fuel tank.

21. The fuel system of claim 20, wherein each of the first tank end support portion and the second tank end support portion comprises a first tank bracket and a second tank bracket, the first tank bracket having a first side facing the fuel tank and a second side facing away from the fuel tank, and
wherein the first tank bracket comprises a first block having a first support surface configured to be disposed about the first boss and the second tank bracket comprises a second block having a second support surface configured to be disposed opposite the first support surface and to enclose a space about the first boss.

22. The fuel system of claim 20, wherein a collision load member is coupled with the first tank end support portion and with the second tank end support portion.

23. The fuel system of claim 20, wherein the bracket system is configured to be coupled to the frame rail in a configuration that positions an entirety of each of the first bracket assembly and the second bracket assembly at a frame rail position between, with respect to the longitudinal direction, the first neck portion of the fuel tank and the second neck portion of the fuel tank.

24. The fuel system of claim 20, wherein the first frame rail connection portion and the second frame rail connection portion are connected together by a structural member such that the first frame rail connection portion, the first tank end support portion, the structural member, the second frame rail connection portion, and the second tank end support portion provide a concave frame structure into which the fuel tank can be received with the structural member positioned laterally inward of the central cylindrical portion of the fuel tank.

25. A fuel system, comprising:
a fuel tank comprising a central cylindrical portion, a first end and a second end opposite the first end;
a frame comprising a frame rail connection portion disposed on a vehicle side of the fuel system and a tank support portion disposed around one or both of the first and second ends of the fuel tank;
a cover configured to be disposed at least partially about the central cylindrical portion of the fuel tank; and
a step support configured to apply a load to the central cylindrical portion of the fuel tank, the step support comprising:
a step member coupled to an outer surface of the cover at a first location, the step member comprising a stepping surface extending laterally away from the cover; and
a compressible member coupled to an inner surface of the cover at the first location, the compressible member contacting an outer surface of the central cylindrical portion of the fuel tank.

26. A fuel system, comprising:
a fuel system frame for supporting a fuel tank, the fuel system frame comprising a frame rail connection portion that comprises a first mounting position and a second mounting position, the second mounting position spaced apart from the first mounting position along a longitudinal direction;
a first bracket configured to connect to the frame rail connection portion of the fuel system frame at the first mounting position or at the second mounting position to support the fuel system frame from either the first mounting position or the second mounting position; and
a second bracket having a first portion configured to mate with the first bracket and a second portion configured to connect to a vehicle frame rail that extends along the longitudinal direction.

27. The fuel system of claim 26, wherein the first mounting position and the second mounting position are disposed along a continuous slot formed in the frame rail connection portion of the fuel system frame.

28. The fuel system of claim 26, wherein the first mounting position is at least partially defined by a first plurality of apertures in the frame rail connection portion, wherein the second mounting position is at least partially defined by a second plurality of apertures in the frame rail connection portion, wherein the first plurality of apertures comprises at least one aperture that is not part of the second plurality of apertures, and wherein the second plurality of apertures comprises at least one aperture that is not part of the first plurality of apertures.

29. The fuel system of claim 26, wherein the first bracket comprises a flange positioned between first and second support wings, and the first bracket further comprises one or more resilient members disposed between the flange and one or both of the first or second support wings.

30. The fuel system of claim 26, wherein the first bracket comprises a central flange and first and second support wings extending forwardly and rearwardly of the central flange.

* * * * *